(12) United States Patent
Martirosyan et al.

(10) Patent No.: US 12,353,504 B2
(45) Date of Patent: Jul. 8, 2025

(54) COMPUTER-IMPLEMENTED SYMBOLIC DIFFERENTIATION USING FIRST-ORDER RETRACTION

(71) Applicant: Skydio, Inc., San Mateo, CA (US)

(72) Inventors: Hayk Martirosyan, San Francisco, CA (US); Aaron Christopher Miller, San Francisco, CA (US); Nathan Leo Bucki, San Mateo, CA (US); Bradley Matthew Solliday, San Francisco, CA (US); Ryan David Kennedy, San Francisco, CA (US); Jack Louis Zhu, San Mateo, CA (US); Teodor Tomic, Redwood City, CA (US); Yixiao Sun, Stanford, CA (US); Josiah Timothy VanderMey, Redwood City, CA (US); Gareth Benoit Cross, San Carlos, CA (US); Peter Benjamin Henry, San Francisco, CA (US); Dominic William Pattison, Cupertino, CA (US); Samuel Shenghung Wang, Mountain View, CA (US); Kristen Marie Holtz, Menlo Park, CA (US); Harrison Zheng, Palo Alto, CA (US)

(73) Assignee: Skydio, Inc., San Mateo, CA (US)

( * ) Notice: Subject to any disclaimer, the term of this patent is extended or adjusted under 35 U.S.C. 154(b) by 176 days.

(21) Appl. No.: 18/161,026

(22) Filed: Jan. 27, 2023

(65) Prior Publication Data

US 2023/0280765 A1 Sep. 7, 2023

Related U.S. Application Data

(60) Provisional application No. 63/344,755, filed on May 23, 2022, provisional application No. 63/304,537, filed on Jan. 28, 2022.

(51) Int. Cl.
*G06F 17/16* (2006.01)
*B64C 39/02* (2023.01)
(Continued)

(52) U.S. Cl.
CPC ............ *G06F 17/16* (2013.01); *B64C 39/024* (2013.01); *B64U 10/00* (2023.01); *G05D 1/0022* (2013.01);
(Continued)

(58) Field of Classification Search
CPC .......... G06F 17/16; G06F 9/526; G06F 17/18; B64C 39/024; B64U 10/00; B64U 2201/00
See application file for complete search history.

(56) References Cited

U.S. PATENT DOCUMENTS 9,352,833 B2 5/2016 Kruglick
2011/0137506 A1 6/2011 DeMarco et al.
(Continued)

FOREIGN PATENT DOCUMENTS

JP 2022011663 A 1/2022
WO WO-2017007527 A2 * 1/2017 ............. G01B 21/22

*Primary Examiner* — Kito R Robinson
*Assistant Examiner* — Roy Rhee
(74) *Attorney, Agent, or Firm* — Young Basile Hanlon & MacFarlane, P.C.

(57) ABSTRACT

A computer accesses an input element storage and an output element storage. The computer accesses a symbolic expression for output element storage as a function of the input element storage. The computer computes, using a symbolic computation engine of the computer, a symbolic expression for the tangent space Jacobian of the output element storage with respect to an input tangent space. The computer outputs the computed expression.

15 Claims, 15 Drawing Sheets

(51) Int. Cl.
*B64U 10/00* (2023.01)
*G05D 1/00* (2024.01)
*G06F 9/52* (2006.01)
*G06F 17/18* (2006.01)
*G06V 10/75* (2022.01)
*B64U 101/30* (2023.01)

(52) U.S. Cl.
CPC ......... *G05D 1/0038* (2013.01); *G05D 1/0088* (2013.01); *G05D 1/0825* (2013.01); *G05D 1/101* (2013.01); *G06F 9/526* (2013.01); *G06F 17/18* (2013.01); *G06V 10/751* (2022.01); *B64U 2101/30* (2023.01); *B64U 2201/00* (2023.01); *B64U 2201/10* (2023.01); *B64U 2201/20* (2023.01)

(56) References Cited

U.S. PATENT DOCUMENTS

| | | |
|---|---|---|
| 2015/0284010 A1 | 10/2015 | Beardsley et al. |
| 2017/0291704 A1 | 10/2017 | Alegria |
| 2017/0301246 A1 | 10/2017 | De Prins et al. |
| 2018/0292830 A1 | 10/2018 | Kazemi et al. |
| 2019/0163206 A1 | 5/2019 | Zhu et al. |
| 2020/0276704 A1 | 9/2020 | Sindhwani et al. |
| 2020/0409395 A1 | 12/2020 | Hilliges et al. |
| 2021/0080589 A1 | 3/2021 | Febbo et al. |
| 2021/0300554 A1 | 9/2021 | Bergkvist et al. |
| 2021/0349469 A1 | 11/2021 | Houseago et al. |
| 2022/0277859 A1* | 9/2022 | Alesiani ................ G16H 20/10 |
| 2023/0107622 A1 | 4/2023 | Loussides et al. |
| 2024/0010326 A1 | 1/2024 | Roach et al. |

* cited by examiner

COMPUTER-IMPLEMENTED SYMBOLIC DIFFERENTIATION USING FIRST-ORDER RETRACTION

CROSS-REFERENCE TO RELATED APPLICATION(S)

This application claims priority to U.S. Provisional Patent Application No. 63/304,537, titled "SymForce: Symbolic Computation and Code Generation for Robotics," filed on Jan. 28, 2022, the entire disclosure of which is incorporated herein by reference. This application claims priority to U.S. Provisional Patent Application No. 63/344,755, titled "SymForce: Symbolic Computation and Code Generation for Robotics," filed on May 23, 2022, the entire disclosure of which is incorporated herein by reference.

TECHNICAL FIELD

This disclosure relates to an unmanned aerial vehicle (UAV) operated based on cost functions.

BACKGROUND

Typically, a UAV is controlled by a human from a ground-based controller. However, in some cases, automatic operation of the UAV (i.e., without direct or indirect human control) may be desirable. The automatic operation may take into account multiple features, for example, a UAV being used for imaging may take into account a distance from a target, a camera angle, and a position of the UAV relative to the target.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
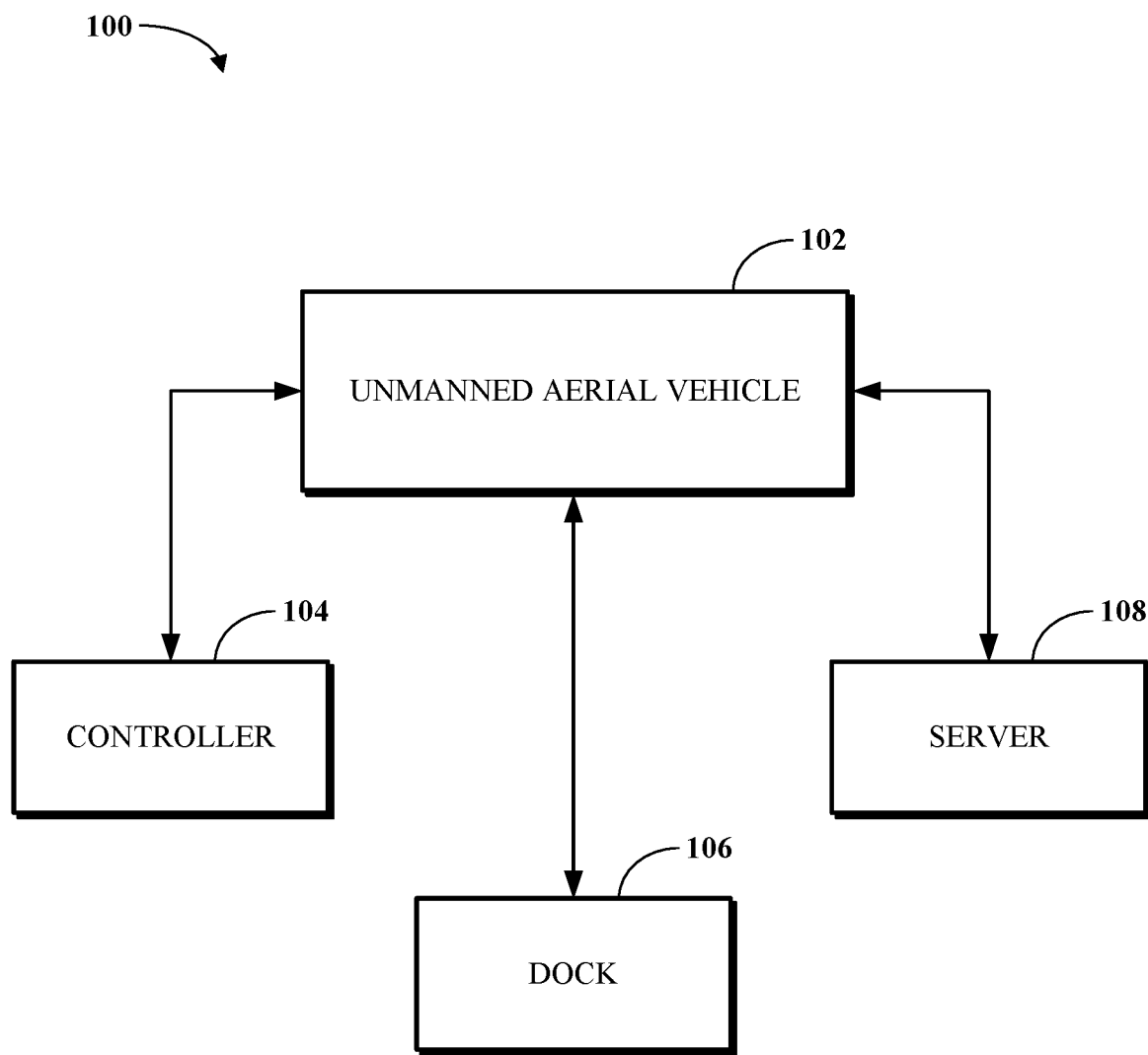
FIG. 1 is an illustration of an example of a UAV system.

A UAV is an aircraft without any human pilot, crew, or passengers on board. Typically, the UAV is controlled by a human using a ground-based controller. However, in some situations, the UAV may be controlled automatically, for example, in response to losing a connection to the ground-based controller or in order to automatically fulfil a goal specified via the ground-based controller. The goal may be multifaceted (e.g., imaging a target from a certain distance and at a certain angle, while avoiding a defined region in space, where the target is an object or location to be imaged) and may be expressed as an optimization of several cost functions. Techniques for automatic UAV control to meet a multifaced goal expressed in terms of cost functions may be desirable.

A UAV is configured to travel in order to reach a goal based on a problem definition comprising cost functions. The UAV accesses the problem definition including the cost function from a memory unit onboard or external to the UAV. The flight control subsystem of the UAV controls movement of the UAV based on the cost functions. Controlling movement of the UAV may include automatically determining a flight path, a tilt, and/or a camera angle of the UAV. Before or during flight of the UAV (or at a server before the software is uploaded to the UAV), the flight control subsystem adjusts one or more of the cost functions based on a user input and/or a conflict detected between two or more of the cost function. The flight control subsystem controls further movement of the UAV based on the adjusted cost functions.

As used herein, a cost function is a function that defines a "cost" in terms of one or more variables. The cost function may be optimized to reduce the cost and may be implemented within a set of constraints (e.g., other cost functions). In one example, a UAV is tasked with imaging a target and a simple cost function may be $c=d^2$, where c is the cost and d is the distance between the UAV and the target when the image is taken. (Images taken from a closer distance to the target are more valuable and, therefore, are assigned a lower cost in terms of reduced quality.) To optimize this cost function (i.e., to minimize the cost), the UAV may attempt to get as close to the target as possible. A problem definition may include one or multiple cost functions that define a UAV's goals. For example, in addition to the $c=d^2$ cost function, an operator of a UAV may risk receiving a monetary penalty if the UAV flies over certain areas or during certain hours. These monetary penalties, along with an estimate of a probability of detection, may be included in the cost functions of the problem definition. Another cost function may relate to the amount of energy (e.g., fuel or electricity) consumed by the UAV during flight. Another cost function may be used to ensure that the UAV has sufficient fuel or battery power to return to its base station. As described above, the cost functions may cover different things, for example, the cost functions related to the monetary penalty may relate to the UAV's travel path, while the $c=d^2$ cost function may relate to the UAV's position when the image is taken, rather than the path the UAV took to reach that position.

As a result of techniques disclosed herein, a UAV could optimize its travel based on multiple factors (e.g., distance from target, distance from dock, remaining battery power) using cost functions. This enhances the autonomous control of the UAV by allowing for cost function-based decision making.

Some implementations are described herein as being performed via a UAV. However, alternative implementations may be performed at an aerial vehicle or a land-based vehicle that is not a UAV. The techniques disclosed herein are not limited to being implemented at UAVs only. The techniques are described herein as being implemented at a flight control subsystem onboard a UAV. However, in alternative implementations, the techniques may be implemented remotely at a user device or a server that communicates with the UAV.

Some implementations disclosed herein include various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Some aspects of the technology described herein are directed to the technical problem of automatically controlling movement of a UAV based on a set of rules, expressed as cost functions. Typically, during flight of the UAV, a human operator must be constantly controlling the UAV in order to achieve the objectives of the flight, while ensuring that the UAV has sufficient battery power to return to the base station. Reducing the amount of human involvement in UAV operation during flight may be desirable to allow for automated uses of UAVs, for example, to deliver items or to obtain imagery of targets. The technical solution provides an improvement to UAV technology by a flight control subsystem of the UAV accessing a problem definition including cost functions associated with travel of the UAV. The cost functions may mathematically represent competition of various goals of the UAV. For example, a goal may be to obtain imagery of a target while remaining close to a base station, with cost functions associated with the quality of the imagery and the distance from the base station. The flight control subsystem controls movement of the UAV based on the cost functions. During flight, the flighty control subsystem may adjust the cost functions (e.g., in response to an input or a change in conditions). The flight control subsystem further controls movement of the UAV based on the adjusted cost functions. A technical effect of some aspects is that the UAV is controlled, for at least part of its flight, based on the cost functions and without human intervention.

Some aspects of the technology described herein are directed to the technical problem of providing computer-implemented symbolic differentiation using the chain rule at a multithreaded computing device. Typically, symbolic differentiation is completed by hand. However, this is a cumbersome process when large matrices are being differentiated. Manual symbolic differentiation may be very error prone or impossible where there are tight time constraints. (For example, in the context of a UAV, a navigation or arm-positioning decision may be made instantaneously based on a differentiation result. It would not be possible to consult a human and have the differentiation completed in real-time.) Thus, computer-implemented symbolic differentiation may be desirable. Some aspects provide an improvement to computer technology by, in a computer with multithreaded processing circuitry, using the multithreaded processing circuitry to provide parallel processing and decrease the time required for computer-implemented symbolic differentiation. The technical solution includes a computing device accessing a first symbolic expression for an output value as a function of an input value. A first thread of the multithreaded processing circuitry computes a first symbolic Jacobian of the input value with respect to an input tangent space from a symbolic Lie group definition stored in the memory of the computing device. A second thread of the multithreaded processing circuitry computes a second symbolic Jacobian of the output value with respect to the input value. A third thread of the multithreaded processing circuitry computes a third symbolic Jacobian of an output tangent space with respect to the input value from the symbolic Lie group definition. The computing device applies symbolic matrix multiplication to the first symbolic Jacobian, the second symbolic Jacobian, and the third symbolic Jacobian to obtain a second symbolic expression for the output tangent space with respect to the input tangent space, with the second symbolic expression being the result of the symbolic differentiation. A technical effect of some aspects is that the first thread, the second thread, and the third thread operate in parallel, increasing the processing speed of symbolic differentiation. The multithreaded processing circuitry technique is integrated into a practical application to provide real-time symbolic differentiation that can be used to make real-time decisions onboard a UAV or in robotic or computer vision contexts.

Some aspects of the technology described herein are directed to the technical problem of providing computer-implemented symbolic differentiation using first order retraction. Typically, symbolic differentiation is completed by hand. However, this is a cumbersome process when large matrices are being differentiated. Manual symbolic differentiation may be very error prone or impossible where there are tight time constraints. (For example, in the context of a UAV, a navigation or arm-positioning decision may be made instantaneously based on a differentiation result. It would not be possible to consult a human and have the differentiation completed in real-time.) Thus, computer-implemented symbolic differentiation may be desirable. The technical solution uses a computing device that includes a symbolic computation engine. The symbolic computation engine is an improvement to computer technology that leverages the processing circuitry of the computing device to manipulate symbolic mathematical expressions stored in the memory. The symbolic computation engine improves computer technology and integrates the technology into a practical application by generating data structures representing mathematical expressions and may modify these data structures to perform operations (e.g., differentiation) on the mathematical expressions. The computing device accesses, from the memory, an input element storage and a symbolic perturbation vector in an input tangent space. The computing device retracts, by manipulating data structures representing mathematical expressions using the symbolic computation engine, the input element storage by the symbolic perturbation vector to generate a perturbed input element storage. The computing device accesses, from the memory, a symbolic expression for output element storage as a function of the input element storage. The computing device then manipulates the data structures representing mathematical expressions using the symbolic computation engine to complete the differentiation.

Specifically, the computing device substitutes, in the symbolic expression using the symbolic computation engine, the perturbed input element storage for the input element storage. The computing device computes, using the symbolic computation engine, local coordinates for a perturbed output relative to an unperturbed output. The computing device generates, using the symbolic computation engine, a symbolic expression for a perturbed output element tangent vector as a function of input element storage and input tangent space perturbation. The computing device computes, using the symbolic computation engine, a Jacobian of output tangent vector elements with respect to an input perturbation. The computing device generates, using the symbolic computation engine, a symbolic expression for a tangent space Jacobian of the output element storage with respect to the input tangent space as a function of the input element storage and the input tangent space perturbation. The computing device sets, using the symbolic computation engine, the symbolic perturbation vector to zero to generate a symbolic expression for the tangent space Jacobian of the output element storage with respect to the input tangent space as a function of the input element storage. The symbolic expression for the tangent space Jacobian of the output element storage with respect to the input tangent space is the result of the symbolic differentiation.

To describe some implementations in greater detail, reference is first made to examples of hardware and software structures used to implement path determination for a UAV. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone, but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for charging a battery of the UAV 102 while the UAV 102 is on or in the dock 106. The dock 106 may be a protective enclosure from which the UAV 102 is launched. A location of the dock 106 may correspond to the launch point of the UAV 102.

The server 108 is a remote computing device from which information usable for operation of the UAV 102 may be received and/or to which information obtained at the UAV 102 may be transmitted. For example, the server 108 may be used to train a learning model usable by one or more aspects of the UAV 102 to implement functionality of the UAV 102. In another example, signals including information usable for updating aspects of the UAV 102 may be received from the server 108. The server 108 may communicate with the UAV 102 over a network, for example, the Internet, a local area network, a wide area network, or another public or private network.

In some implementations, the system 100 may include one or more additional components not shown in FIG. 1. In some implementations, one or more components shown in FIG. 1 may be omitted from the system 100, for example, the server 108.

Figure 2A:
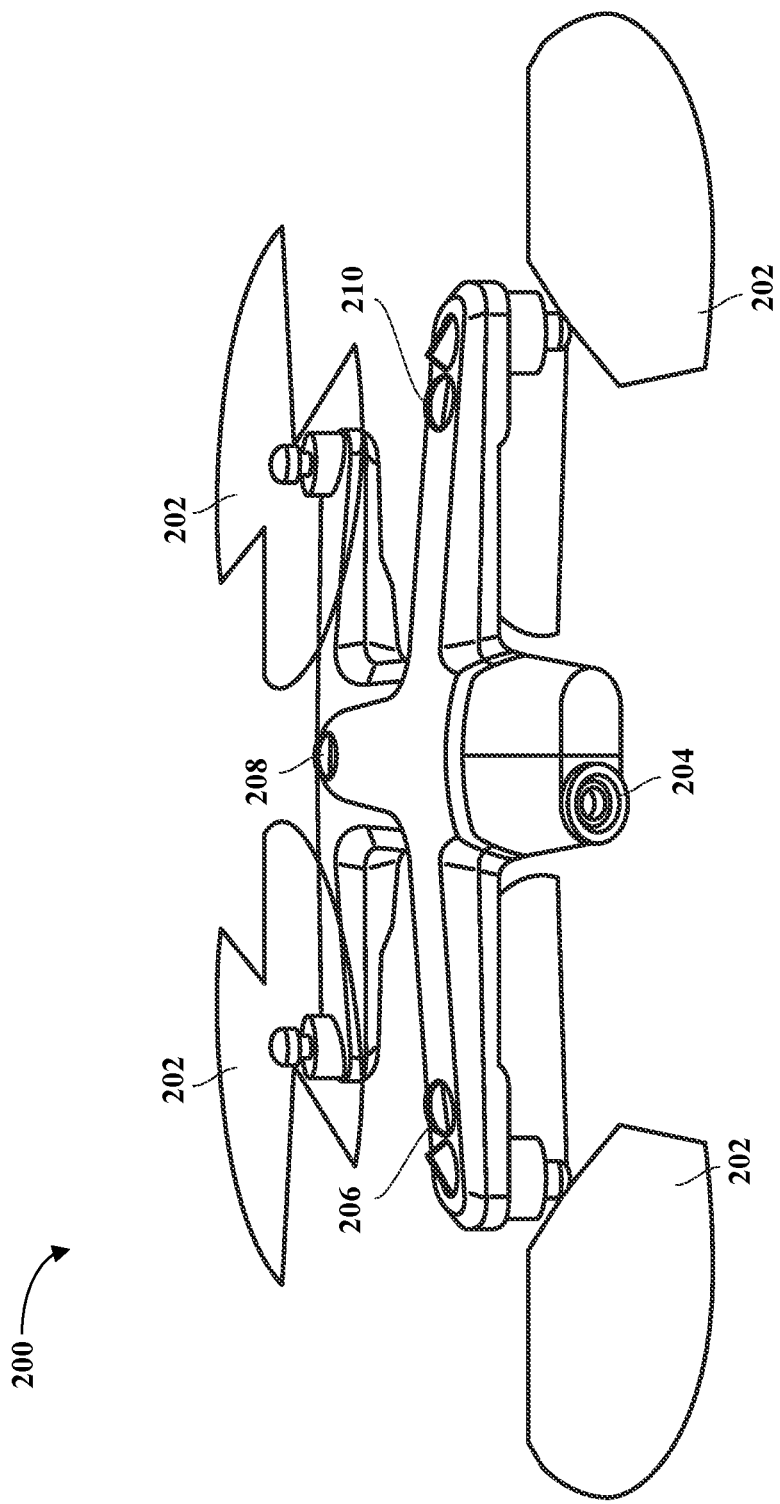
FIG. 2A is an illustration of an example of a UAV as seen from above.
Figure 2B:
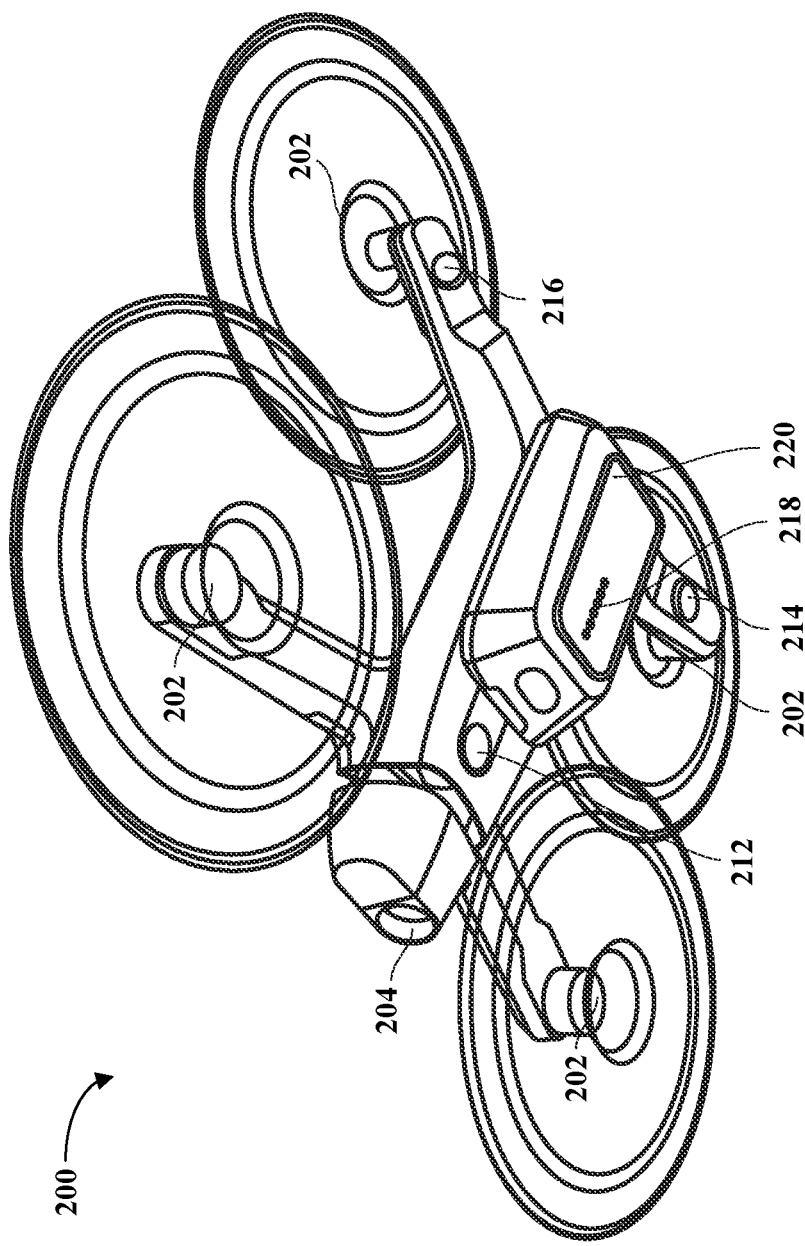
FIG. 2B is an illustration of an example of a UAV as seen from below.

An example illustration of a UAV 200, which may, for example, be the UAV 102 shown in FIG. 1, is shown in FIGS. 2A-B. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 212, 214, and 216 arranged on the bottom of the UAV 200 may be seen. These image sensors 212, 214, and 216 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 220 attached on the bottom of the UAV 200, with conducting contacts 218 to enable battery charging. The bottom surface of the battery pack 220 may be a bottom surface of the UAV 200.

Figure 3:
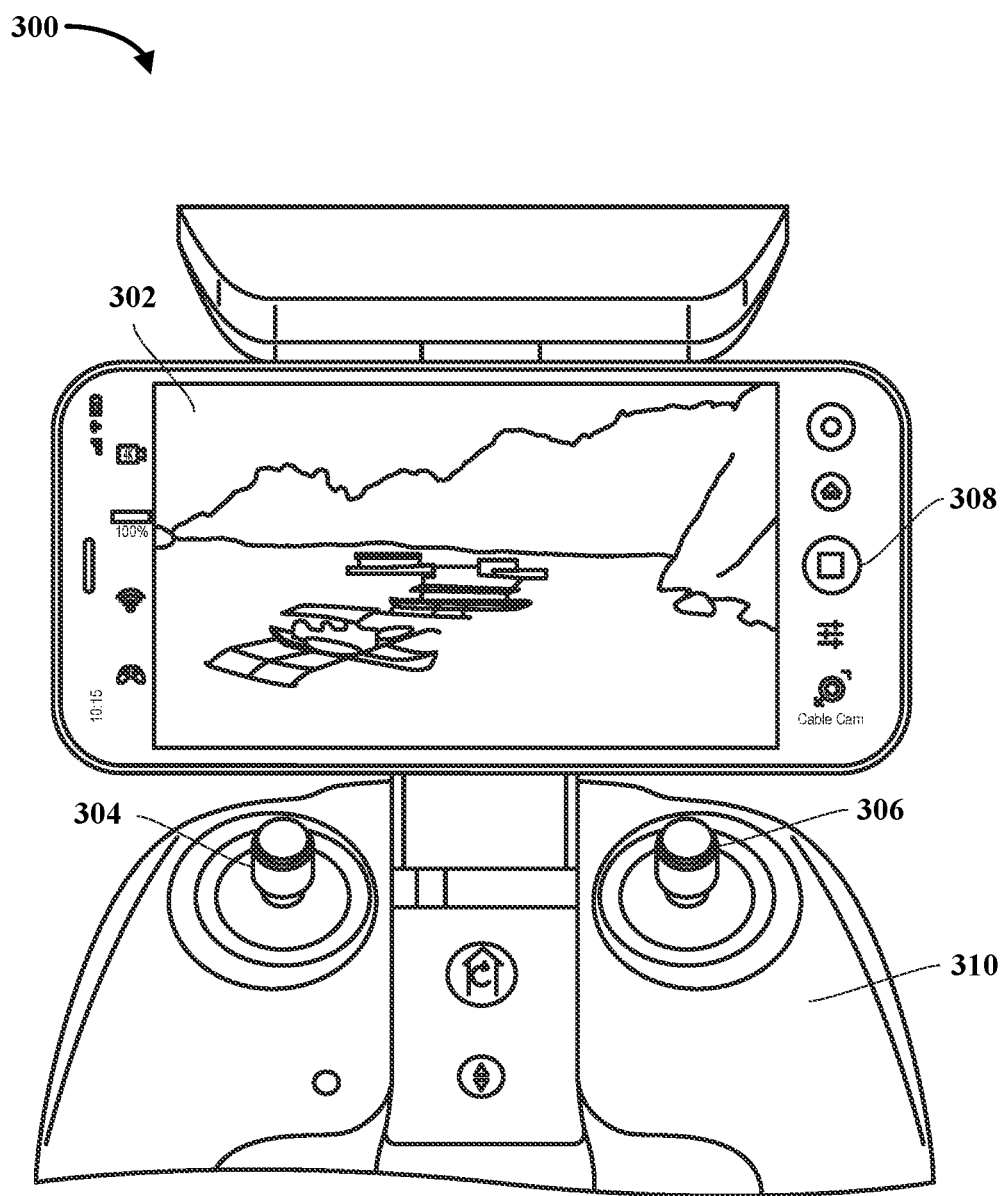
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing addition control surfaces including the left joystick 304 and the right joystick 306, may provide range extending communication capabilities for longer distance communication with the UAV.

Figure 4:
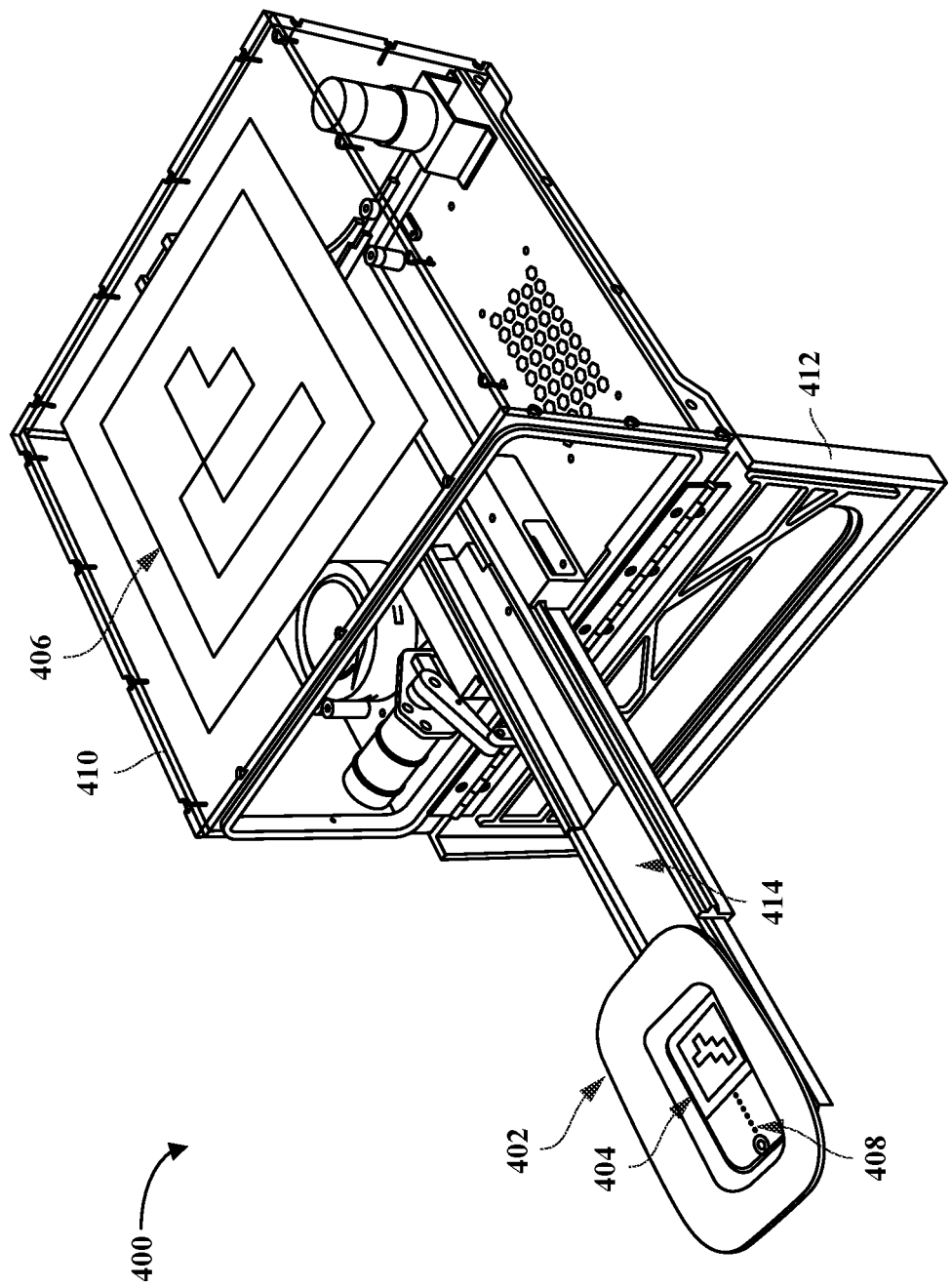
FIG. 4 is an illustration of an example of a dock for facilitating autonomous landing of a UAV.

FIG. 4 is an illustration of an example of a dock 400 for facilitating autonomous landing of a UAV, for example, the UAV 102 shown in FIG. 1. The dock 400 may, for example, be the dock 106 shown in FIG. 1. The dock 400 may be a base station. The dock 400 includes a landing surface 402 with a fiducial 404, charging contacts 406 for a battery charger, a box 408 in the shape of a rectangular box with a door 410, and a retractable arm 412.

The landing surface 402 is configured to hold a UAV. The UAV may be configured for autonomous landing on the landing surface 402. The landing surface 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may server to prevent the aerial vehicle from rotating on the landing surface 402 after the bottom surface of the aerial vehicle has settled into the base of the funnel shape of the landing surface 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 406 are contacts of a battery charger on the landing surface 402, positioned at the bottom of the funnel. The dock 400 includes a charger configured to charge a battery of the UAV while the UAV is on the landing surface 402. For example, a battery pack of the UAV (e.g., the battery pack 220 shown in FIG. 2) may be shaped to fit on the landing surface 402 at the bottom of the funnel shape. As the UAV makes its final approach to the landing surface 402, the bottom of the battery pack will contact the landing surface and be mechanically guided by the tapered sides of the funnel to a centered location at the bottom of the funnel. When the landing is complete, the conducting contacts of the battery pack may come into contact with the conducting contacts 406 on the landing surface 402, making electrical connections to enable charging of the battery of the UAV. The dock 400 may include a charger configured to charge the battery while the UAV is on the landing surface 402.

The box 408 is configured to enclose the landing surface 402 in a first arrangement and expose the landing surface 402 in a second arrangement. The dock 400 may be configured to transition from the first arrangement to the second arrangement automatically by performing steps including opening the door 410 of the box 408 and extending the retractable arm 412 to move the landing surface 402 from inside the box 408 to outside of the box 408.

The landing surface 402 is positioned at an end of the retractable arm 412. When the retractable arm 412 is extended, the landing surface 402 is positioned away from the box 408 of the dock 400, which may reduce or prevent propeller wash from the propellers of a UAV during a landing, thus simplifying the landing operation. The retractable arm 412 may include aerodynamic cowling for redirecting propeller wash to further mitigate the problems of propeller wash during landing. The retractable arm supports the landing surface 402 and enables the landing surface 402 to be positioned outside the box 408, to facilitate takeoff and landing of a UAV, or inside the box 408, for storage and/or servicing of a UAV.

In some implementations, the dock 400 includes a second, auxiliary fiducial 414 on an outer surface of the box 408. The root fiducial 404 and the auxiliary fiducial 414 may be detected and used for visual localization of the UAV in relation the dock 400 to enable a precise landing on a small landing surface 402. For example, the fiducial 404 may be a root fiducial, and the auxiliary fiducial 414 is larger than the root fiducial 404 to facilitate visual localization from farther distances as a UAV approaches the dock 400. For example, the area of the auxiliary fiducial 414 may be 25 times the area of the root fiducial 404. For example, the auxiliary fiducial 414 may include an asymmetric pattern that enables robust detection and determination of a pose (i.e., a position and an orientation) of the auxiliary fiducial 414 relative to the UAV based on an image of the auxiliary fiducial 414 captured with an image sensor of the UAV.

Figure 5:
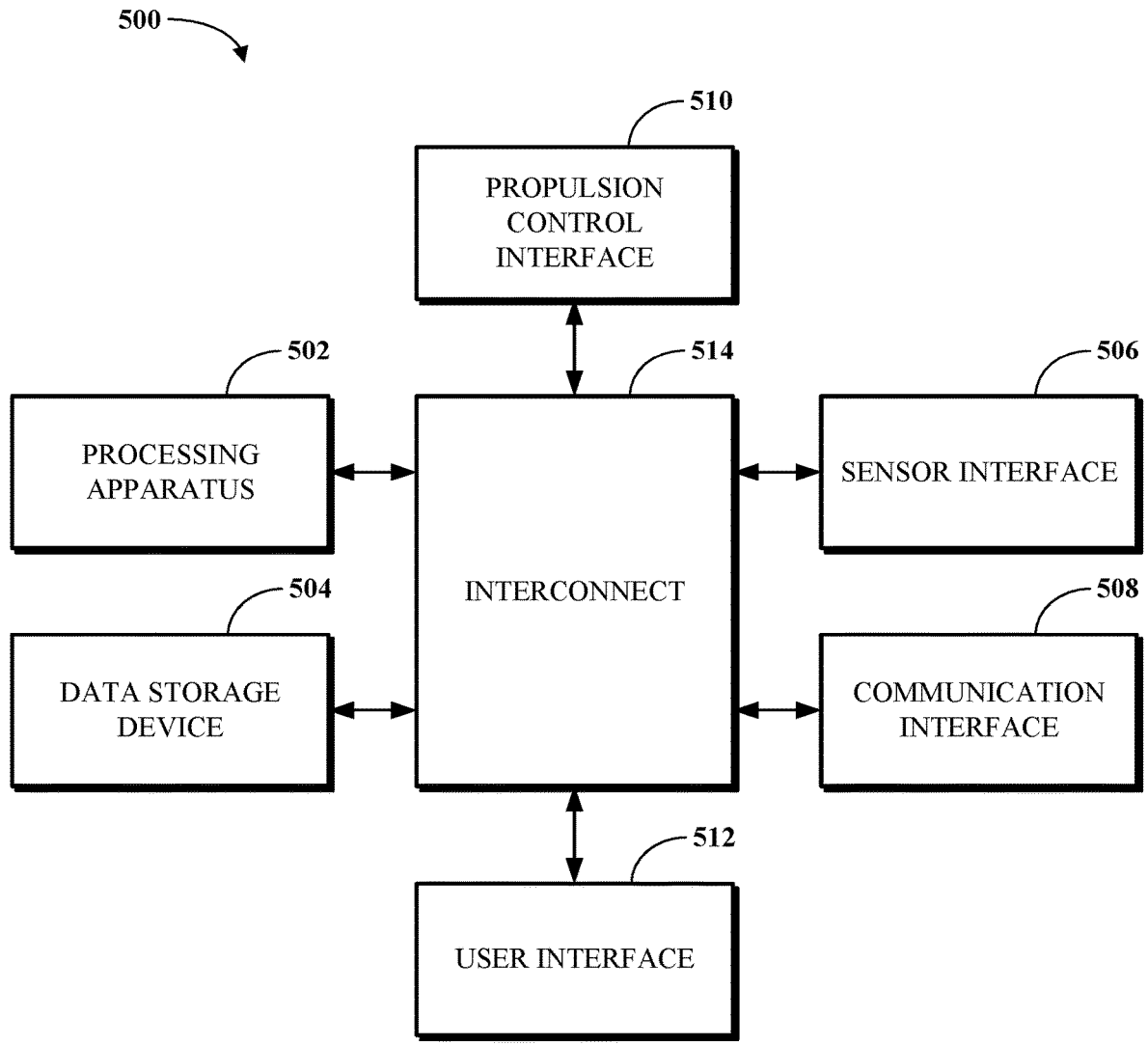
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data. The processing apparatus 502 may be arranged into processing unit, such as a central processing unit (CPU) or a graphics processing unit (GPU).

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor, an accelerometer, a gyroscope, a geolocation sensor, a barometer, and/or another sensor. In some implementations, the sensor interface 506 may implement a serial port protocol (e.g., I2C or SPI) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or USB). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an OLED display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
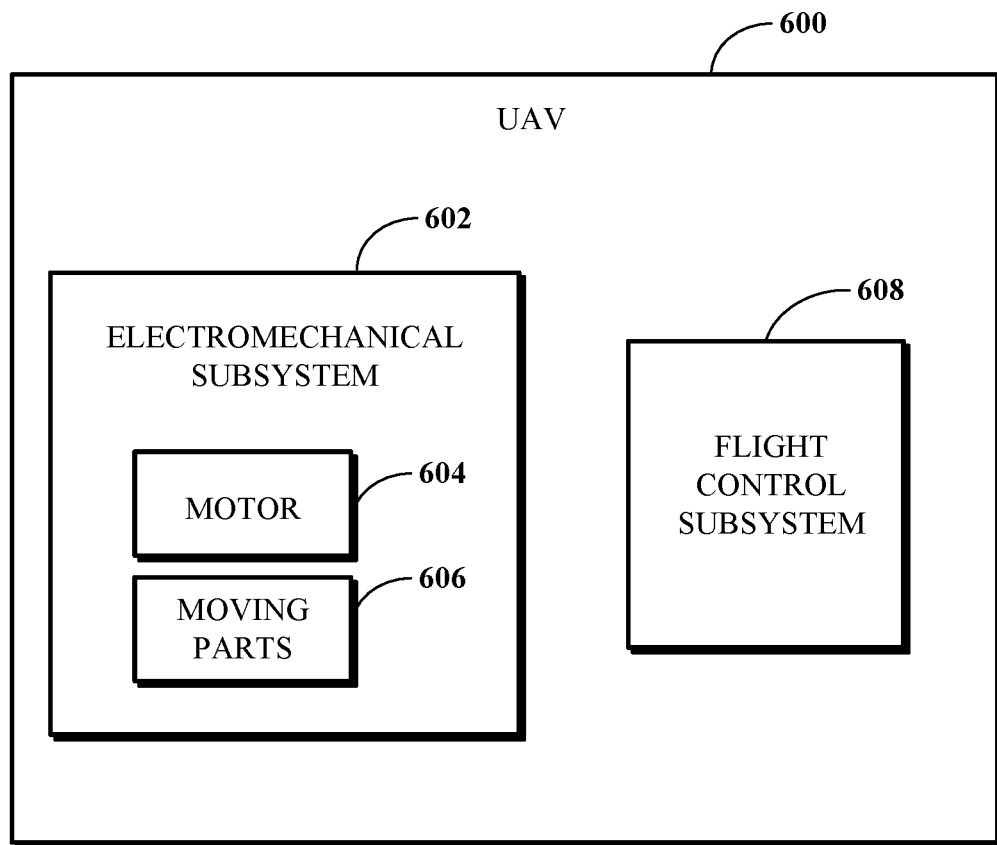
FIG. 6 is a block diagram of an example UAV operated based on cost functions.

FIG. 6 is a block diagram of an example UAV 600 operated based on cost functions. The UAV 600 may correspond to the UAV 102, the UAV 200, and/or the UAV 500. As shown, the UAV 600 includes an electromechanical subsystem 602, and a flight control subsystem 608. The electromechanical subsystem 602, which includes a motor 604 and moving parts 606, flies the UAV and operates the UAV to perform tasks (e.g., imaging or sensing tasks). The motor 604 may include one or more electric motors for operating the moving parts 606. The moving parts 606 may include propellers, arms, or the like.

The flight control subsystem 608 directs the electromechanical subsystem 602 to fly the UAV 600. The flight control subsystem 608 determines a path for the UAV 600 to fly and navigates the UAV 600 according to the path by transmitting instructions to the electromechanical subsystem 602. The instructions may be transmitted over an interconnect (e.g., the interconnect 514). The flight control subsystem 608 may also direct movement of moving parts 606 (e.g., an arm supporting a camera) of the UAV 600 to perform a specified task (e.g., imaging a specified target). The flight control subsystem 608 is described in more detail in conjunction with FIG. 7.

Figure 7:
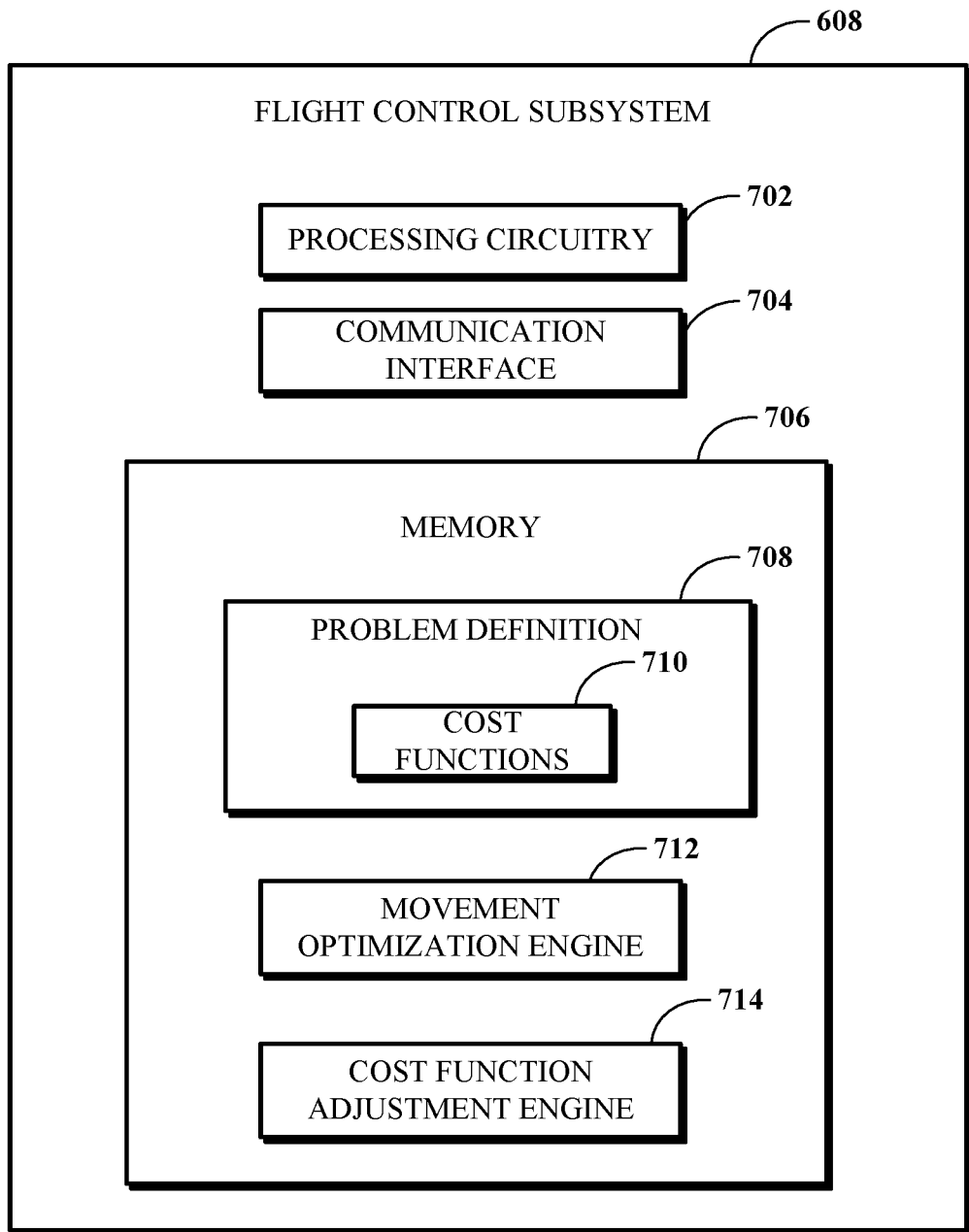
FIG. 7 is a block diagram of an example flight control subsystem for a UAV operated based on cost functions.

FIG. 7 is a block diagram of an example of the flight control subsystem 608 for a UAV operated based on cost functions.

As shown, the flight control subsystem 608 includes processing circuitry 702, a communication interface 704, and a memory 706. The processing circuitry 702 includes one or more processors. Each processor may include RAM for temporarily storing instructions read from the memory 706 or elsewhere while the instructions are being executed. Each processor may include a single or multiple processing cores. Alternatively, the processing circuitry 702 may include another type of device, or multiple devices, capable of manipulating or processing data. The processing circuitry 702 may be arranged into processing units, such as a CPU or a GPU. The processing circuitry 702 may correspond to the processing apparatus 502. The communication interface 704 transmits and receives communications from external devices, such as the controller 104, the dock 106, or the server 108. The communication interface 704 may correspond to the communication interface 508. The memory 706 stores data or instructions. The memory 706 may be a non-transitory computer-readable medium. The memory 706 may include at least one of a solid-state drive, a ROM, an optical disc, a magnetic disc, or another suitable type of storage device. The memory 706 may correspond to the data storage device 504. As shown, the memory 610 stores a problem definition 708 comprising cost functions 710, a movement optimization engine 712, and a cost function adjustment engine 714. The problem definition 708, the movement optimization engine 712, and/or the cost function adjustment engine 714 may be implemented using software, hardware, or a combination of software and hardware.

According to some implementations, the processing circuitry 702 accesses, from the memory 706, the problem definition 708 including the cost functions 710 associated with travel of the UAV 600. The problem definition 708 including the cost functions 710 may be entered into the memory 706 via a user interface at the controller 104 or a computing device connected to the server 108 and/or the dock 106. For example, the user may type the cost functions 710 expressed in terms of a position in three-dimensional space of an angle of the UAV or an arm of the UAV relative to one or more predefined axes or planes.

The movement optimization engine 712 includes software code which, when executed by the processing circuitry 702, causes the processing circuitry 702 to cause movement of the UAV 600 based on the cost functions 710. Causing the movement may, for example, include automatically determining a flight path of the UAV 600, automatically determining a tilt of the UAV 600, or automatically determining a camera angle of a camera of the UAV 600. As used herein, the term "automatically" may include, among other things, a computation being made without direct human input.

The cost function adjustment engine 714 includes software code which, when executed by the processing circuitry 702, causes the processing circuitry 702 to adjust one or more of the cost functions 710 during a flight of the UAV 600 based on a user input (e.g., received using the communication interface 704) or a conflict detected between two or more of the cost functions 710. For example, if the user input indicates a travel path that is distinct from a travel path computed using the 710, the travel path may be adjusted based on the user input and movements of the moving parts 606 may be adjusted using the cost functions 710 and based on the new travel path. The processing circuitry 702, based on code stored in the movement optimization engine 712, causes further movement of the UAV 600 based on the adjusted cost functions 710. More details of examples of the operation of the flight control subsystem 608 are provided in conjunction with FIG. 8.

The cost functions 710 may include any mathematical functions. For example, if the UAV 600 is assigned (e.g., in the problem definition 708) to image a target, the cost functions 710 may be based on previously generated imagery of the target, a distance of the UAV 600 from the target, and a camera angle of a camera of the UAV relative to the target. Adjusting the cost functions may be useful if there is a conflict between two cost functions or if there is a conflict between one or more cost functions and a user input. As a result, a movement of the UAV 600 may be implemented even if it conflicts with one of the cost functions.

Figure 8:
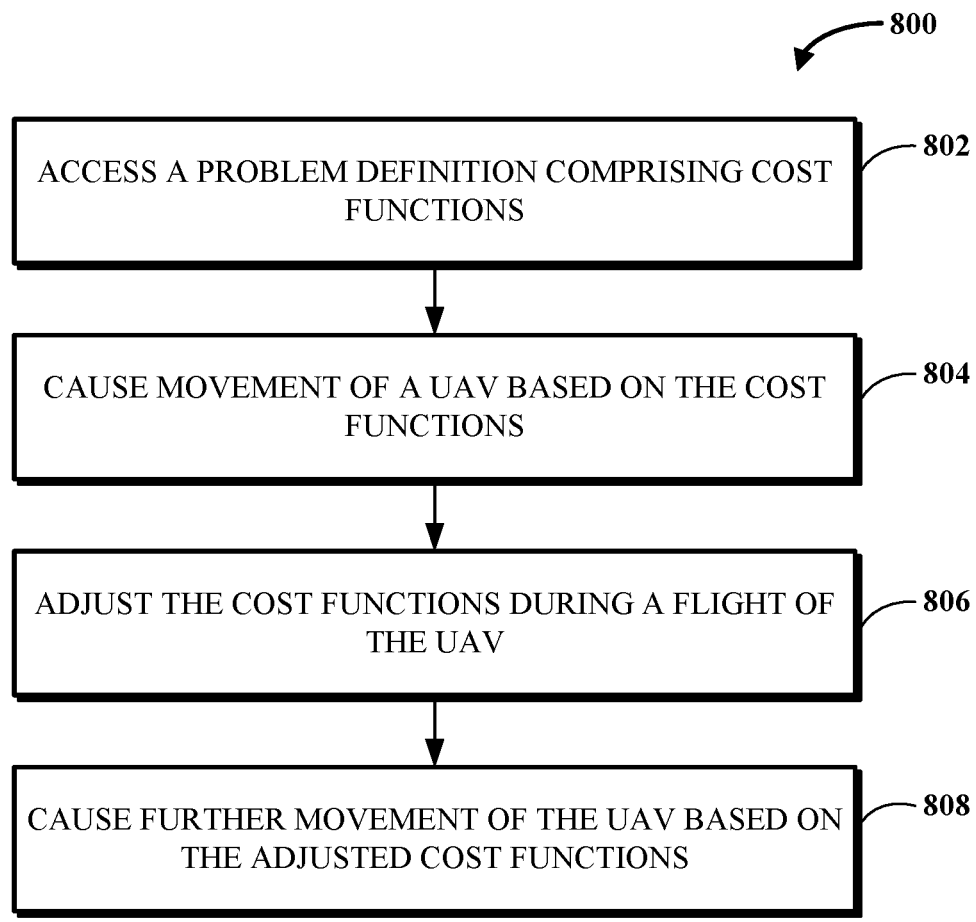
FIG. 8 is a flowchart of an example of a technique for controlling movement of a UAV operated based on cost functions.

FIG. 8 is a flowchart of an example of a technique 800 for controlling movement of a UAV (e.g., the UAV 102, the UAV 200, the UAV 500, or the UAV 600) operated based on cost functions. The technique 800 may be performed using a computer, for example, an onboard computer of the UAV (e.g., the flight control subsystem 608) and/or an external device communicating with the UAV (e.g., at least one of the controller 104, the dock 106, or the server 108). The external device may communicate with the UAV over a network and/or over a direct connection.

At block 802, the computer accesses, from a memory unit, a stored problem definition comprising cost functions associated with travel of the UAV. For example, the problem definition may have been previously stored in the memory unit and may be read by processing circuitry of the computer. The memory unit may be internal to the computer or an external data repository. The cost functions may take into account a distance to a target (e.g., an object to be imaged, sensed, or otherwise accessed by the UAV) and/or an angle between a line associated with the UAV and a line associated with the target. According to some examples, the cost functions may include a function representing a difference between an expected position of the unmanned aerial vehicle in a three-dimensional space and an actual position of the unmanned aerial vehicle in the three-dimensional space. According to some examples, the cost functions may include a function representing a distance in pixels between a position of an object in an image captured by the camera and a center point of the image.

In some implementations, the cost functions are represented using symbolic expressions. The computer manipulates the symbolic expressions to compute a tangent-space derivative of a Lie group element or a tangent-space Jacobian, for example, as described in conjunction with FIG. 9 and/or FIG. 10.

At block 804, the computer causes movement of the UAV based on the cost functions. Causing movement may include transmitting instructions to an electromechanical subsystem of the UAV. Causing movement may include automatically determining a flight path of the UAV, automatically determining a tilt of the UAV, and/or automatically determining a camera angle of a camera of the UAV.

At block 806, the computer adjusts one or more of the cost functions during a flight of the UAV. The cost functions may be adjusted based on a user input and/or a conflict detected between two or more of the cost functions. For example, the user input may include a user manually entering a modification to a cost function through a user interface. Alternatively, the user input may include a request (e.g., entered via a controller of the UAV) for an action (e.g., travel through a high-cost zone) that is forbidden by one of the cost functions. A conflict between two cost functions may be detected by the computer based on one cost function causing travel or movement of the UAV in a manner that is very costly by another cost function. As a result, the computer may determine that one or both of the cost functions need to be adjusted. In one example, one cost function suggests that a camera arm should be extended and pointed at a target and another cost function suggests that the camera arm should not be extended to conserve energy during flight. A conflict between these two cost functions could be resolved by extending the camera arm only during imaging of the target.

At block 808, the computer causes further movement of the UAV based on the adjusted cost functions. The block 806 and the block 808 may be repeated one or multiple times until the flight of the UAV is completed.

Figure 9:
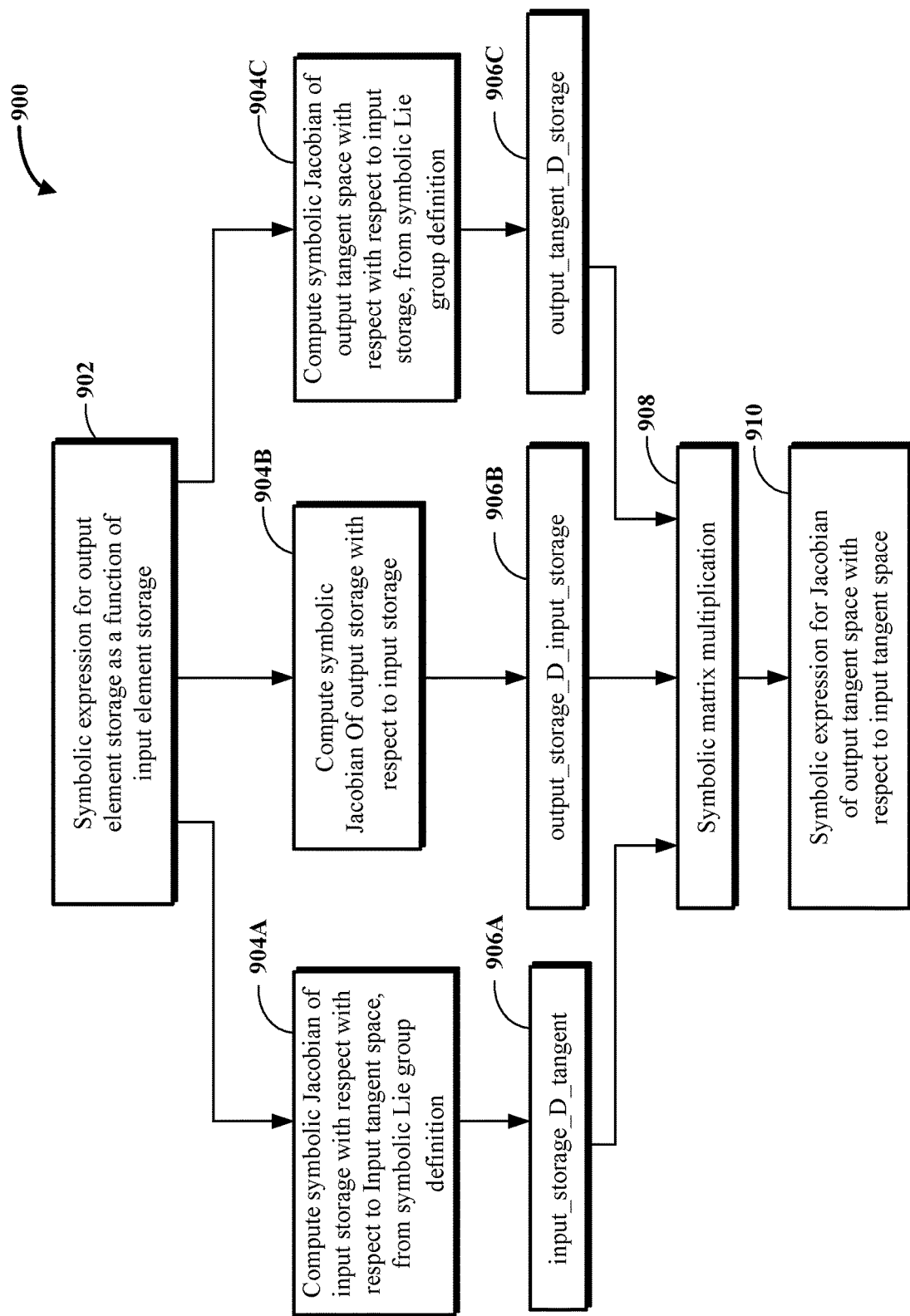
FIG. 9 is a flowchart of an example of a symbolic chain rule technique for operating a UAV based on cost functions.

FIG. 9 is a flowchart of an example of a symbolic chain rule technique 900 for operating a UAV based on cost functions. The technique 900 may be performed in conjunction with the technique 800 by the computer performing the technique 800, for example to manipulate the symbolic expressions used to represent the cost functions, as described above.

At block 902, the computer accesses a cost function comprising a symbolic expression for an output element storage as a function of an input element storage. The "element storage" is a sequence of symbolic expressions for each of the scalars in the underlying representation of a Lie group element, i.e., the actual representation of that Lie group element in memory. This may apply to both the "output element" and the "input element" of the function being differentiated. The Jacobians include Jacobian matrices representing the symbolic derivative of each of the mentioned quantities (all of which may be vectors of symbolic expressions) with respect to some other quantity (which again may be vectors). Block 902 is followed by blocks 904A, 904B, and 904C.

At block 904A, the computer computes a first symbolic Jacobian of the input storage with respect to an input tangent space from a symbolic Lie group definition, resulting in a derivative of input storage with respect to tangent 906A.

At block 904B, the computer computes a second symbolic Jacobian of the output storage with respect to the input storage, resulting in a derivative of output storage with respect to input storage 906B.

At block 904C, the computer computes a third symbolic Jacobian of output tangent space with respect to the input storage from a symbolic Lie group definition, resulting in a derivative of output tangent with respect to storage 906C. As shown, the blocks 904A, 904B, and 904C are implemented in parallel. In some cases, the blocks 904A, 904B, and 904C may be implemented serially and in any order. In some cases, one or more of the blocks 904A, 904B, and/or 904C may be skipped. As described above, three Jacobians are computed. In alternative implementations, any number N of Jacobians may be computed, where N is an integer greater than or equal to one.

At block 908, the computer applies symbolic matrix multiplication to the derivative of input storage with respect to tangent 906A, the derivative of output storage with respect to input storage 906B, and the derivative of output tangent with respect to storage 906C to obtain a symbolic expression 910 for the output tangent space with respect to the input tangent space. The computer stores or provides/transmits as output the symbolic expression 910. The symbolic expression 910 may correspond to the original cost function accessed at block 902 expressed in the tangent space. The symbolic expression 910 may be easier to manipulate and to implement (e.g., in conjunction with other cost functions) than the original cost function. In order to optimize the cost function efficiently, some implementations use the Jacobian of the cost function, as opposed to simply the value of the cost function itself. This Jacobian is naturally with respect to the mentioned tangent spaces because the inputs and outputs are elements of Lie groups.

Figure 10:
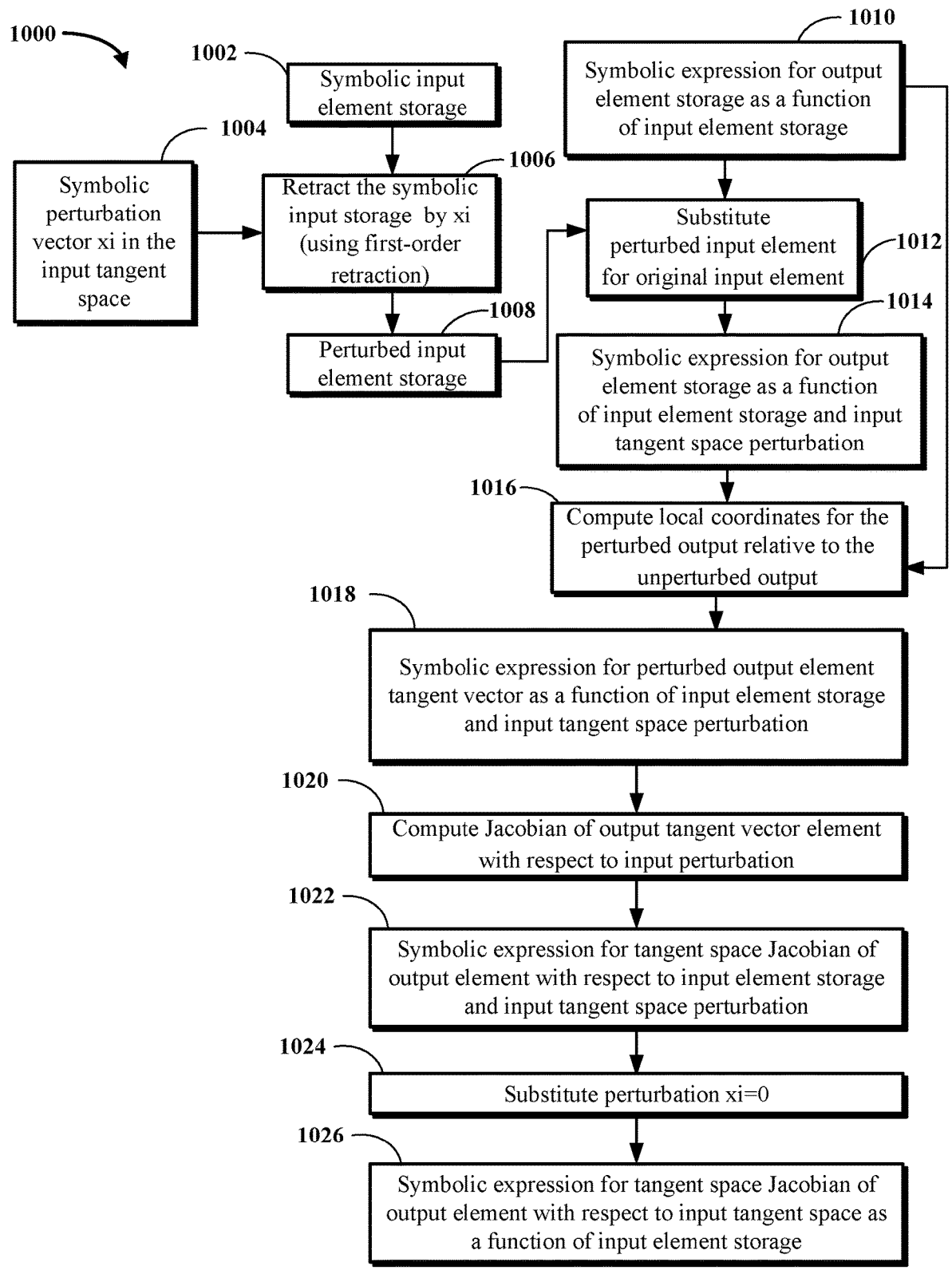
FIG. 10 is a flow chart of an example of a symbolic first order retraction technique for operating a UAV based on cost functions.

FIG. 10 is a flow chart of an example of a symbolic first order retraction technique 1000 for operating a UAV based on cost functions. The technique 1000 may be performed in conjunction with the technique 800 by the computer performing the technique 800, for example to manipulate the symbolic expressions used to represent the cost functions, as described above.

As shown, the computer accesses symbolic input element storage 1002 and a symbolic perturbation vector xi in the input tangent space 1004. At block 1006, the computer retracts the input element storage by xi (using first order retraction) to generate perturbed input element storage 1008.

The computer accesses a first symbolic expression 1010 for output element storage as a function of the input element storage. At block 1012, the computer substitutes, in the first symbolic expression 1010, the perturbed input element storage for the input element storage. The result is a second symbolic expression 1014 for output element storage as function of the input element storage and the input tangent space perturbation.

At block 1016, the computer computes local coordinates for the perturbed output relative to an unperturbed output based on the second symbolic expression 1014 and the first symbolic expression 1010. This results in a third symbolic expression 1018 for the perturbed output element tangent vector as a function of input element storage and input tangent space perturbation.

At block 1020, the computer computes a Jacobian of output tangent vector elements with respect to input perturbation. This results in a fourth symbolic expression 1022 for a tangent space Jacobian of an output element with respect to the input tangent space as a function of the input element storage and the input tangent space perturbation.

At block 1024, the computer sets the symbolic perturbation vector xi to zero. This results in the generation of a fifth symbolic expression 1026 for the tangent space Jacobian of the output element with respect to the input tangent space as a function of the input element storage.

The operations of FIG. 9 and FIG. 10 are described as being performed on a UAV and during flight of the UAV. However, in some implementations, these operations performed at a server (e.g., the server 108) or a computer (e.g., the controller 104 or another computer) before upload to the UAV and before the flight of the UAV.

Some implementations relate to SymForce, a library for fast symbolic computation, code generation, and nonlinear optimization for robotics applications like computer vision, motion planning, and controls. SymForce combines the development speed and flexibility of symbolic math with the performance of autogenerated, highly optimized code in C++ or any target runtime language. SymForce provides geometry and camera types, Lie group operations, and branchless singularity handling for creating and analyzing complex symbolic expressions in Python, built on top of SymPy. Generated functions can be integrated as factors into the tangent-space nonlinear optimizer. Some implementations relate to methods to automatically compute tangent-space Jacobians, eliminating the need for bug-prone hand-written derivatives.

SymForce is a symbolic computation and code generation library that combines the development speed and flexibility of symbolic mathematics in Python with the performance of autogenerated, highly optimized code in C++ or any target runtime language. SymForce makes it possible to code a problem once in Python, experiment with it symbolically, generate optimized code, and then run highly efficient optimization problems based on the original problem definition.

Some implementations relate to developing algorithms for autonomous robots, where performance and code maintainability are relevant to use cases such as computer vision, state estimation, motion planning, and controls.

SymForce builds on top of the symbolic manipulation capabilities of the SymPy library. Symbolic math (e.g., symbolic representation of cost functions) allows for rapid understanding, interactive analysis, and symbolic manipulations like substitution, solving, and differentiation. SymForce adds symbolic geometry and camera types with Lie group operations, which are used to autogenerate fast runtime classes with identical interfaces. By using one symbolic implementation of any function to generate runtime code for multiple languages, some implementations improve the iteration cycle, minimize the chance of bugs, and achieve performance that matches or exceeds state-of-the-art approaches with no specialization.

Some implementations result in not having to implement, test, or debug any Jacobians. In the robotics domain, correct and efficient computation of derivatives is useful. One approach is to hand-write Jacobians in C++ or Compute Unified Device Architecture (CUDA) for a core set of operations and rely on automatic differentiation to chain them together. SymForce introduces novel methods to automatically compute tangent-space Jacobians of functions that operate on Lie groups, avoiding bug-prone handwritten derivatives. As a result, the approach avoids dynamic memory allocation and chain ruling at runtime. SymForce often dramatically outperforms standard approaches by flattening code across expression graphs, sharing subexpressions, and taking advantage of sparsity. Some implementations relate to a method for preventing singularities without introducing branches.

Some implementations relate to a library. The library provides symbolic implementation of geometry and camera types with Lie group operations, and fast runtime classes with identical interfaces. The library provides code generation for turning arbitrary symbolic functions into structured and fast runtime functions. The library provides a tangent-space optimizer (e.g., in C++ and/or Python). The library provides modular and extensible code.

Some implementations relate to computing tangent-space Jacobians and avoiding handwritten derivatives. Implementations may include a method for avoiding singularities in complex expressions without introducing branching. Implementations may include flattening computation across functions and matrix multiplications, for example, for automatic differentiation.

Figure 11:
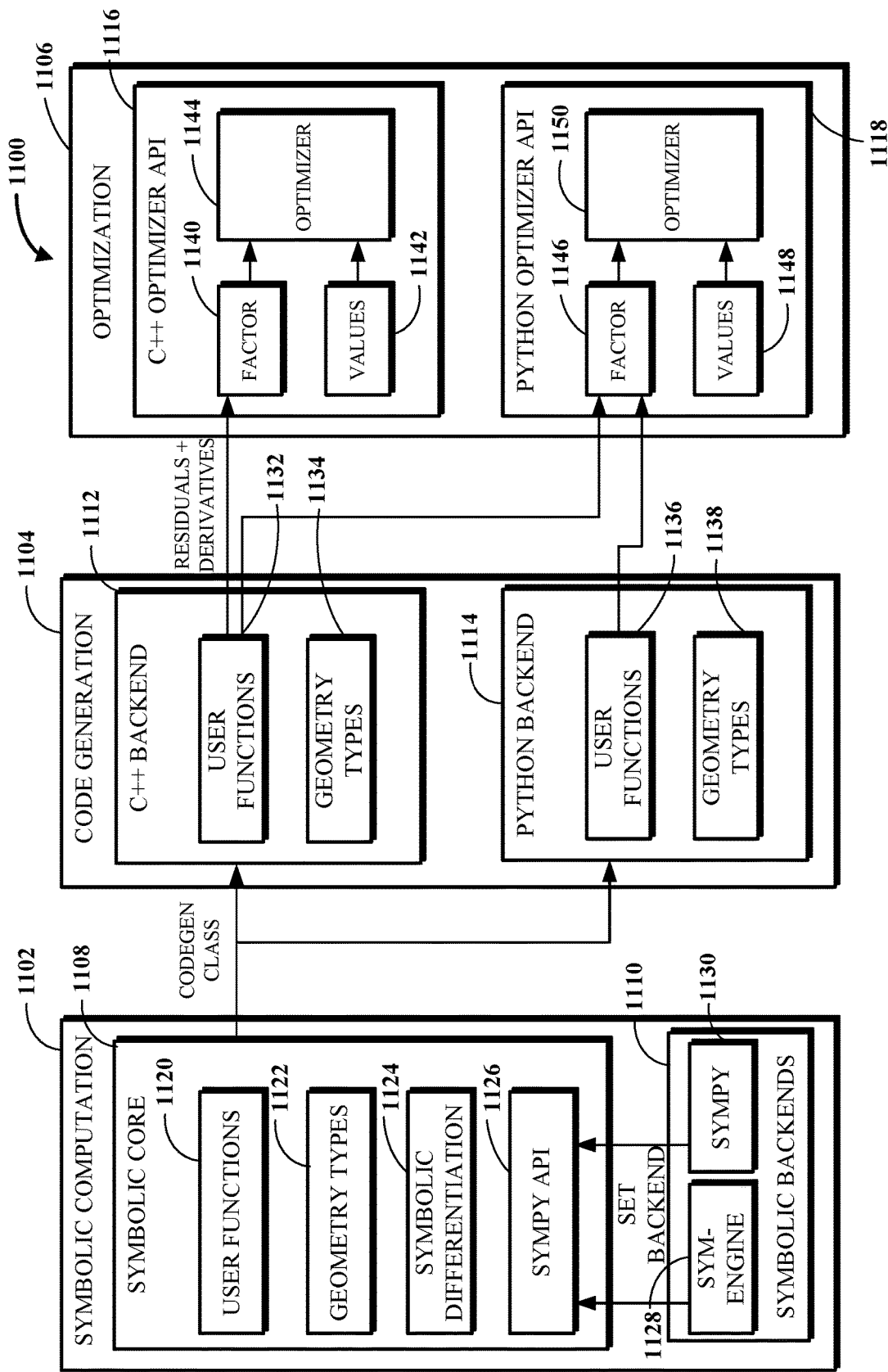
FIG. 11 is an architecture diagram of a system for symbolic computation and code generation used in connection with the operation of a UAV based on cost functions.

FIG. 11 is an architecture diagram of a system 1100 for symbolic computation and code generation used in connection with operation of a UAV based on cost functions. As shown, the system 1100 includes symbolic computation 1102, code generation 1104, and optimization 1106. The symbolic computation 1102 includes a symbolic core 1108 and symbolic backends 1110. The code generation 1104 includes a C++ backend 1112 and a python backend 1114. the optimization 1106 includes a C++ optimizer application programming interface (API) 1116 and a python optimizer API 1118.

The symbolic core 1108 includes user functions 1120, geometry types 1122, symbolic differentiation 1124, and a SymPy API 1126. The symbolic backends 1110 include SymEngine 1128 and SymPy 1130 communicating with the SymPy API 1126. The C++ backend 112 includes user functions 1132 and geometry types 1134. The python backend 1114 includes user functions 1136 and geometry types 1138. The user functions 1120 may map to user functions 1132 and user functions 1136.

The C++ optimizer API 1116 includes a factor 1140 and values 1142 that map to an optimizer 1144. The factor 1140 may be based on residuals and derivatives of the user functions 1132. The python optimizer API 1118 includes a factor 1146 and values 1148 that map to an optimizer 1150. The factor may be based on the user functions 1132 and the user functions 1136.

Symbolic expressions may be written in Python. Fast runtime code is autogenerated from these expressions, which can then be used as standalone functions or factors in the nonlinear optimizer. Together these components provide a workflow from prototypes to production code.

Symbolic math libraries that generate fast code may be used in several niches of robotics. SymPy 1130 is written in Python, which allows users to modify it and leverage a large ecosystem of libraries. However, it can scale poorly to complex expressions. SymEngine 1128 is a C++ backend that supports the SymPy API 1126 while being up to two orders of magnitude faster. These libraries also provide routines for code generation and common subexpression elimination (CSE). SymForce builds on the capabilities of SymPy 1128 and SymEngine 1130 by adding essential geometry and vision types, Lie group operations, tools for handling singularities, structured code generation, and integration with optimization tools. These additions may make SymForce a more complete tool for complex robotics tasks.

Optimization libraries like GT-SAM, Ceres, and g2o provide useful tools for efficiently formulating and minimizing cost functions, especially for nonlinear least-squares problems found in the field of robotics and computer vision. SymForce follows the factor graph formulation used in GTSAM, but residual functions are autogenerated from symbolic expressions. Relative to alternatives, the optimizer has faster performance and lower memory overhead for many tasks. In addition, the approach may eliminate the need for handwritten derivatives and avoids the runtime overhead of applying the chain rule to Jacobians during automatic differentiation.

Rotations, poses, and camera models are central to robotics code, and getting efficient and correct tangent-space Jacobians is a common task for many optimization use cases. GTSAM defines geometry types and their Lie calculus in C++ and wraps them in Python. Sophus uses SymPy implementations to generate some derivative expressions. Manif is a C++ library with handwritten Lie group operations. The wave geometry library provides expression template-based automatic differentiation of Lie groups in C++. LieTorch implements Lie groups in PyTorch. SymForce is inspired by GTSAM and Sophus. The definitions of the geometry types are symbolic, with improved naming and consistency over Sophus and no hardcoded derivatives. SymForce autogenerates runtime classes that resemble the GTSAM variants in C++, but have faster performance and do not require maintaining handwritten code.

Libraries like PyTorch, TensorFlow, and JAX can build up computation graphs by tracing python code and applying automatic differentiation (AD) to compute gradients. These libraries often have high overhead for the small input dimensions that SymForce is built to tackle (tens to hundreds of variables). They also perform poorly for second-order optimization techniques common in robotics, because they are primarily targeted at computing gradients and not Hessians, and have poor performance for sparse matrices. In contrast, SymForce can compute Jacobians and Hessians of complex expressions with no operational overhead, making it suitable for use on resource-constrained embedded platforms. In addition, SymForce avoids the need for matrix multiplication at runtime that is needed for AD. Julia provides several AD libraries, but does not reach the performance of C++ and lacks the broader ecosystem of Python. Numba can accelerate arbitrary Python functions, but does not compute derivatives.

SymForce provides tools for building and analyzing complex symbolic expressions in Python, by extending the SymPy API 1126. There is a separation between code structure and performance, allowing the user to encapsulate their code without sacrificing performance.

The symbolic computation 1102 centers around manipulation of mathematical expressions as algebraic instead of numerical quantities. Functions, symbols, and literals are stored as classes in code that can be traversed and transformed with symbolic substitution, simplification, differentiation, and solving. These tools allow users to interactively study and refine their functions.

SymForce supports two symbolic backends 1110—SymPy 1128 and SymEngine 1130. SymEngine 1130 is an engine (e.g., using software in the programming language C++) compatible with the SymPy API 1126 for manipulating mathematical expressions (e.g., large mathematical expressions).

SymForce implements several core types used in robotics, such as matrices, rotations, poses, camera models, noise models, and barrier functions. These types have symbolic implementations defined as Python classes. Fast runtime classes with identical interfaces are autogenerated for target languages.

The generated classes do not depend on the rest of SymForce and can be deployed as standalone tools with minimal dependencies. For example, the generated C++ classes depend only on Eigen and the Python types only on NumPy. In C++ they are templated on the scalar type, and require zero dynamic memory allocation, making them suitable for embedded environments. The autogenerated runtime classes are functional, with readable interfaces and excellent test coverage.

To allow generic code to operate on all geometry types some implementations use a concepts (or traits) mechanism inspired by GTSAM. Using concepts instead of inheritance allows generic programming with external types such as language-defined scalar and sequence types, or NumPy and Eigen matrices. It also makes it possible to extend or add new types, both within SymForce and in user code.

SymForce includes storage ops that allow all types to be converted to and from a sequence of scalars which comprise the internal rep-resentation of the type. For example, the SO(3) type is represented by a quaternion, whose storage contains 4 scalars. It also supports common tasks like substitution, numerical evaluation, and simplification.

SymForce includes group ops that register types as mathematical groups. A group type must have an associative composition operation, an identity element, and an inverse.

SymForce includes Lie group ops that register types as Lie groups, meaning that in addition to being groups, they are differentiable manifolds with operations to go from group elements to perturbations in a local Euclidean space (tangent space).

In Python, this mechanism is implemented with dynamic dispatch, for example ops.GroupOps.inverse(element). In C++, this is done via template specialization, for example sym::GroupOps<sym::Pose3f>::Inverse( ).

Generation of fast runtime code from symbolic expressions is the core of SymForce. The Codegen class is the primary tool for all code generation tasks. It uses SymPy's code printers and adds support for struct types, Eigen/NumPy matrices, and the geometry and camera types. The resulting function contains flattened native code, but with a structured and human-readable interface that integrates nicely with the geometry types and optimization framework.

C++ is the code generation backend for SymForce. Generated C++ functions are templated on the scalar type with support for float, double, and std::complex. However, some implementations make it simple to add code generation backends targeting new languages, leveraging the template system based on the jinja Python library.

One step in code generation is common subexpression elimination (CSE), which is the process of traversing a symbolic expression to find duplicate intermediate terms and pulling them out into temporary variables that are computed only once.

SymForce provides an optimization library in C++ and Python which works naturally with the code generation tools and Lie group types. It performs tangent space optimization using a factor graph formulation inspired by GTSAM and a low-overhead implementation of the Levenberg-Marquardt algorithm. This may be used for real-time execution.

As an example, the point_residual function can be interpreted as a residual between two points, parameterized by the pose world_T_local. To minimize this residual, a function is generated that computes the Jacobian J of the residual b, as well as the Gauss-Newton approximation for the Hessian $J^T J$ and right-hand side $J^T b$, which form the Gauss-Newton update $\delta x=-(J^T J)J^T b$. This function is generated automatically from point_residual using Codegen with_linearization.

Note that some implementations could simply output J and b and compute $J^T J$ and $J^T b$ by doing matrix multiplications at runtime, but computing these products symbolically might be computationally advantageous.

This function is used to construct Factor objects, which represent residual blocks within the optimization that touch a set of optimized variables. All problem inputs and initial guesses are stored in a Values class, and the Optimizer class is invoked to minimize the residual of all factors. The optimizer uses the LieGroupOps concept on the C++ Values to perform tangent space retraction.

This functionality may be implemented in Python via a wrapped version of the optimization framework. This allows for quick prototyping without compiling any code, with the ability to generate C++ from the same symbolic implementation and have confidence that runtime results will be identical.

In the example illustrated above, one instance of the generated factor is instantiated per measurement in C++. This is very flexible and allows using the library of existing factors or handwritten functions without writing any symbolic code. However, SymForce also supports generating an entire problem consisting of many residual terms as one large function. This approach can yield large efficiency gains because of expressions automatically shared between multiple factors. Some aspects provide an OptimizationProblem class to organize large symbolic problems and generate functions at multiple levels of granularity to feed to the Optimizer, which may be implemented using the C++ optimizer API 1116 or the python optimizer API 1118.

Some aspects provide a GncOptimizer subclass of Optimizer that implements Graduated Non-Convexity (GNC). GNC is a method for transitioning from a convex cost function to a robust cost function as the optimization converges, to create a wider basin of convergence while still incorporating outlier rejection. Some aspects provide an implementation of the adaptive robust loss function from using the singularity handling approach. The GNC optimizer works with any tunable loss function.

Some implementations use symbolic computation to speed up code by reducing the work performed at runtime. This may involve function flattening, sparsity exploitation, and/or algebraic simplification.

In function flattening, SymForce gains enormous performance advantages by generating runtime functions that consist of a single branchless chain of instructions that share all common subexpressions.

Software engineers strive to organize code into easily composable functions. Often, computing a desired quantity requires invoking many sub-functions. While having structured code improves usability, both the author and the compiler have limited ability to optimize for speed across function boundaries, leading to tension between usability and speed.

Below is a trivial example of a function that uses two helpers, each of which compute common terms inside:

```
def helper_1(a,b):

return a2+abs(a/b)/b2 def helper_2(a,b):

return abs(a/b)+(a2-b2)

def func(a,b):

return helper_1(a,b)-helper_2(a,b)
```

Naively, computing func(a, b) requires 13 operations and the overhead of two function calls, but a capable compiler could inline these tiny functions and compute the result in just 6 operations, making use of helper variables:

$$x_0 = b^2 \quad (1)$$

$$x_1 = \left|\frac{a}{b}\right|$$

$$x_0 - x_1 + \frac{x_1}{x_0}$$

In realistic scenarios, most larger functions are too costly for the compiler to inline, so the execution approaches the naive case. If the redundant calculations and function calls are not acceptable, the alternative is to hand-optimize at the cost of usability by manually flattening the functions or sharing state between the helpers.

Symbolic code addresses this problem with explicit separation between the symbolic and the runtime contexts. The symbolic code is written with small, composable functions, but any evaluated quantities are generated as flat expressions amenable to optimization. In SymForce, computing the runtime variant of func(a, b) requires 6 operations with no additional work, and the benefits scale to very large expressions.

In sparsity exploitation, SymForce can yield order of magnitude speedups in the multiplication of matrices that include zero entries. Any amount of sparsity will lead to a large number of terms that do not need to be computed, as they would otherwise be multiplied by zero at runtime. Take, as an example, two six-by-six matrices X and Y:

$$X = \begin{bmatrix} a & 0 & b & 2b & 0 & 0 \\ 0 & ab & 0 & \frac{a}{b} & a^2 & 0 \\ 0 & 0 & ab^2 & 0 & \frac{a}{b^2} & 0 \\ \frac{a}{b^3} & 0 & 0 & ab^3 & 0 & \frac{a}{b^4} \\ 0 & b^2 & 0 & 0 & ab^4 & 0 \\ 0 & 0 & 0 & 0 & 0 & ab^4 \end{bmatrix} \quad (2)$$

$$Y = \begin{bmatrix} 0 & -ab & b & 0 & 0 & 0 \\ ab & 0 & -a & 0 & 0 & 0 \\ -b & a & 0 & 0 & 0 & 0 \\ 0 & a^2 & 0 & a & 0 & 0 \\ 0 & 0 & b^2 & 0 & b & 0 \\ a^2 & 0 & 0 & 0 & 0 & ab \end{bmatrix} \quad (3)$$

Dense multiplication consumes (N+(N−1)) N² scalar operations, or 396 for N=6. Combined with 21 operations to compute the values within the matrices, it takes a total of 417 symbolic operations to compute XY.

By multiplying matrices symbolically and generating code for the result, some implementations both exploit the structure of the matrices and share expressions between them. XY can be computed in just 34 symbolic operations, a 12× reduction:

$$x_0 = b^2, \; x_1 = ab, \; x_2 = a^2, \; x_3 = bx_2, \quad (4)$$

$$x_4 = x_0 x_2, \; x_5 = a^3, \; x_6 = \frac{1}{b}, \; x_7 = b^3,$$

$$x_8 = ax_7, \; x_9 = \frac{1}{x_0}, \; x_{10} = b^6, \; x_{11} = b^5,$$

$$\begin{bmatrix} -x_0 & x_1 + x_3 & x_1 & 2x_1 & 0 & 0 \\ x_4 & x_5 x_6 & -x_3 + x_4 & x_2 x_6 & x_3 & 0 \\ -x_8 & x_4 & a & 0 & ax_6 & 0 \\ \frac{x_5}{b^4} & -x_2 x_9 + x_5 x_7 & ax_9 & x_2 x_7 & 0 & \frac{x_2}{x_7} \\ x_8 & 0 & -ax_0 + ax_{10} & 0 & ax_{11} & 0 \\ x_{11} x_5 & 0 & 0 & 0 & 0 & x_{10} x_2 \end{bmatrix}. \quad (5)$$

Beyond the symbolic operation count, memory effects must be considered. Instructions are needed to load inputs into registers, with significant penalties for cache misses. The method greatly improves cache performance, because the CPU only manages 12 intermediate inputs rather than the 72 entries of the dense matrices. In other words, most entries of X and Y are never represented.

In robotics and computer vision, matrix multiplication is prevalent in transformations, projections, uncertainty propagation, and especially for Jacobians during automatic differentiation. Performance gains compound from longer chains of matrix multiplications and more complex shared terms between them. SymForce can flatten code across thousands of function calls and matrix multiplications into a single branchless function that shares all common subexpressions.

In algebraic simplification, symbolic expressions can be algebraically simplified into forms that are faster to compute. Categories of simplifications include expansion, factorization, term collection, cancellation, fraction decomposition, trigonometric and logarithmic identities, series expansions, and limits. SymPy provides a wide array of simplifications. Basic simplifications are done automatically on expression construction, but may use specific invocation.

Some implementations relate to symbolic differentiation and techniques for computing tangent-space Jacobians. Some implementations do no use bug-prone handwritten derivatives. In addition, the approach might be faster by avoiding dynamic memory allocation and dense chain ruling at runtime.

Some implementations build on tools in SymPy and SymEngine to automatically compute derivatives of vector-space symbolic expres-sions and extend them to handle the geometry types and Values class. One capability provided by SymForce is computing tangent-space derivatives of arbitrary user-defined functions operating on Lie group types, which is useful for on-manifold optimization and uncertainty propagation.

Symbolic differentiation has some advantages over automatic differentiation, both by using less handwritten code, and by sharing more subexpressions and eliminating the need for matrix multiplication at runtime.

Automatic differentiation (AD) is the prevalent approach for computing derivatives of large computation graphs. Given a computation graph, AD produces another computation graph to compute a particular derivative, with the size of the resulting graph no bigger than a constant multiple of the original.

It is often claimed that symbolic differentiation is intractable or produces exponentially large computation graphs, and is therefore unusable for nontrivial computations. Consider the chain of function calls f(g(h(x, y))). The gradient of f with respect to [x y] is expanded as $$\nabla f = \begin{bmatrix} \frac{\partial f(g(h(x,y)))}{\partial g(h(x,y))} & \frac{\partial g(h(x,y))}{\partial h(x,y)} & \frac{\partial h(x,y)}{\partial x} \\ \frac{\partial f(g(h(x,y)))}{\partial g(h(x,y))} & \frac{\partial g(h(x,y))}{\partial h(x,y)} & \frac{\partial h(x,y)}{\partial y} \end{bmatrix}. \quad (6)$$

Naively, it appears that g is redundantly evaluated. However, this ignores the use of CSE, which results in one evaluation of each unique function and its derivatives, like in AD.

Furthermore, representing the derivative as a flattened symbolic expression allows for powerful simplifications across function and matrix multiplication boundaries, for instance in the common case where the Jacobians used by AD contain shared terms or zeros. As a result, the symbolic differentiation and code generation approach outperforms runtime AD for many robotics problems.

Some implementations relate to two methods to compute tangent-space derivatives of Lie group elements such as SO(3) and SE(3), leveraging vector-space symbolic differentiation. While some implementations describe the techniques for functions that map Lie groups to $\mathbb{R}^n$, the approach generalizes to functions that output Lie groups.

Lie groups are common parameterizations in robotics and computer vision. When computing a derivative of a function whose input is a member of a Lie group, typically the desired quantity is the derivative with respect to a perturbation in the tangent space around the input. Explicitly, consider a function $f(R)$, $f: SO(3) \to \mathbb{R}^n$. Given a retraction operator $R \oplus v$ that applies the perturbation $v \in \mathbb{R}^3$ to R, the desired quantity is $$\frac{d}{dv}[f(R \oplus v)]\bigg|_{v=0}.$$

In some cases, painstaking care is taken to hand-write these tangent-space derivatives. SymForce computes them all automatically. Some implementations provide two approaches for this—symbolic application of the chain rule and first-order retraction.

In the symbolic chain rule method, it is useful to note that while a user of the code operates on Lie group objects, those objects are internally represented as a set of scalar symbols. For instance, some implementations represent SO(3) using unit quaternions. So, while the user can implement f using only group operations without knowing about the internals, the expression that are built for $f(R)$ is a function of 4 scalars, the quaternion components of R. Some aspects define functions S: $SO(3) \to \mathbb{R}^4$ and $S^{-1}: \mathbb{R}^4 \to SO(3)$ to map from the manifold object to the storage representation as a vector and back. If some aspects then let $s=S(R \oplus v)$, some aspects can rewrite the derivative as $$\frac{d}{dv}[f(R \oplus v)] \quad (7)$$
$$= \frac{d}{dv}[f(S^{-1}(S(R \oplus v)))]$$
$$= \frac{d}{ds}[f(S^{-1}(s))]\frac{d}{dv}[S(R \oplus v)].$$

The term $$\frac{d}{dv}[S(R \oplus v)]\bigg|_{v=0}$$

on the right is simply the derivative of the storage of R with respect to the perturbation, and does not depend on $f$. This is a typically simple function of the group elements. The left term does depend on $f$, but as noted before, some aspects already have the symbolic representation of $f(S^{-1}(s))$, and can simply take the symbolic derivative of that expression to get this term. Notably, neither of these derivatives needs to be handwritten, they can be computed automatically from the form of $f$ and from the other functions specifying the group representation, respectively. Then the final tangent-space derivative can be computed by symbolically multiplying these two matrices, and generating a flattened expression for runtime.

In the first-order retraction method, the computer can directly differentiate $f(R \oplus v)$, which is a function between vector spaces, using a first-order approximation of $R \oplus v$ at v=0. This significantly outperforms the previous method in nearly all the trials and is the default approach for computing tangent-space Jacobians in SymForce.

To do this, the computer first builds expressions for the storage entries of $R \oplus v$, which comprise of scalar functions of v. The computer then substitutes each of these expressions for the storage of R in the expression for $f(R)$, producing an expression for $f(R \oplus v)$ which the computer can then symbolically differentiate.

Because some aspects are only interested in the behavior at v=0, some aspects can use a first-order approximation of $R \oplus v$ to simplify the expression without loss of correctness. Explicitly, some aspects use:

$$R \oplus v \approx S^{-1}\left(S(R) + \frac{d}{dv}[S(R \oplus v)]\bigg|_{v=0} v\right), \quad (8)$$

which is typically much simpler than $R \oplus v$.

Some implementations relate to techniques to avoid branches in algorithmic functions, particularly in the context of handling singularity points. Avoiding branches greatly simplifies routines for manipulating complex expressions, and also has a critical impact on runtime performance.

Symbolic expressions are computation graphs that are separate from the code that builds them. Every symbolic operation has a function, a deterministic number of inputs, and a single output.

Some branches can be formulated with primitives like the sign function, absolute value, floor, min, and max. For example, a comparison like (z<=3)?a:b can be represented symbolically as a+max (sign(z−3), 0)(b−a). These operations are performed with bit operations at the assembly level, and do not introduce true branches. This type of branchless programming improves performance because the CPU can pipeline instructions without fear of branch prediction failures.

Some implementations relate to a novel method for handling removable singularities within symbolic expressions that introduces minimal performance impact by avoiding the need for branching. Functions encountered in robotics are often smooth, but properly addressing singularity points is critical to avoid NaN values. Consider the function:

$$f(x) = \frac{\sin(x)}{x}. \tag{9}$$

This function is smooth on its whole domain but has a singularity at x=0, where it takes the form 0/0. The computer can define $$f(0) = \lim_{x \to 0} \frac{\sin(x)}{x} = 1$$

and get a smooth function, but the question remains of how to compute this function in a numerically safe way. A typical approach may be:

def $f(x)$:

if abs($x$)<epsilon:

Approximation for small $x$ return 1−$x$**2/6 else:

return sin($x$)/$x$

This has two problems—it does not result in a single symbolic expression for the result, and might introduce a costly branch. The method is to shift the input to the function away from the singular point with an infinitesimal variable $\epsilon$. If it is assumed that only non-negative x is relevant, this corresponds to defining a new function:

$$f_{safe}(x) = f(x + \epsilon) = \frac{\sin(x + \epsilon)}{x + \epsilon}, \tag{10}$$

where $\epsilon$ is a small positive constant.

For the general case where x∈ ℝ , some aspects first define a function sign_no_zero, or snz, as:

$$snz(x) = \begin{cases} 1 & \text{if } x >= 0 \\ -1 & \text{if } x < 0 \end{cases}, \tag{11}$$

but some aspects also define it as a branchless expression as:

$$snz(x)=2 \min(0,sign(x))+1. \tag{12}$$

Substituting snz into Eq. 10 makes $f_{safe}$ valid for x∈ ℝ :

$$f_{safe}(x) = f(x + snz(x)\epsilon) = \frac{\sin(x + snz(x)\epsilon)}{x + snz(x)\epsilon}. \tag{13}$$

For a function $f(x)$ with a removable singularity, if $f$ is Lipschitz with constant M, it is simple to show that $\|f_{safe}(x)−f(x)\|<=M_\epsilon$. This is typically a perfectly acceptable level of error with a sufficiently small choice of $\epsilon$. The SymForce default epsilon is 2.2e-15 for doubles and 1.2e-6 for floats, chosen as 10× the machine epsilon. (The machine epsilon for a floating-point type is defined as the smallest number which, when added to 1.0, produces a different number.)

It is worth noting that several common functions do not satisfy the above requirement and have values or derivatives that are not Lipschitz. sqrt and acos are defined on [0, ∞) and [−1, 1], respectively, and have infinite derivatives on the boundary. a tan 2 and abs have non-removable singularities at 0 in their value and gradient, respectively. In these cases snz can still perturb the inputs away from the boundary or singularity to prevent unsafe values at runtime, but the general error bound from above does not apply.

In this example the singularity is at x=0, but this approach trivially generalizes to singularities anywhere.

SymForce can check the correctness of a given symbolic function $f_{safe}(x, \epsilon)$ that supposedly uses $\epsilon$ to avoid a removable singularity point at x=$x_0$.

First, the symbolic value of $f_{safe}(x_0, 0)$ is computed. This should evaluate to an indeterminate form like 0/0, which SymPy will represent as NaN. If the value instead is ±∞, the user is trying to correct for a non-removable singularity. $\epsilon$ cannot correct for this, and an error is returned.

Next, the computer takes $$\lim_{x \to x_0} f_{safe}(x, 0),$$

which is the correct value of the function at the singularity. The computer then additionally computes $$\lim_{\epsilon \to 0} f_{safe}(x_0, \epsilon).$$

This should be a finite value, and it should be equal to the first limit, indicating that the function converges to the correct value for small $\epsilon$.

For many functions, it is crucial that the first derivative is also correct at the singularity. This can be tested automatically with the same strategy.

One typical alternative to this approach is to add branching near the singularity. It is possible to locally approximate the point with a Taylor series for this purpose. A similar approach can be approximated in symbolic code using piecewise functions.

Figure 12:
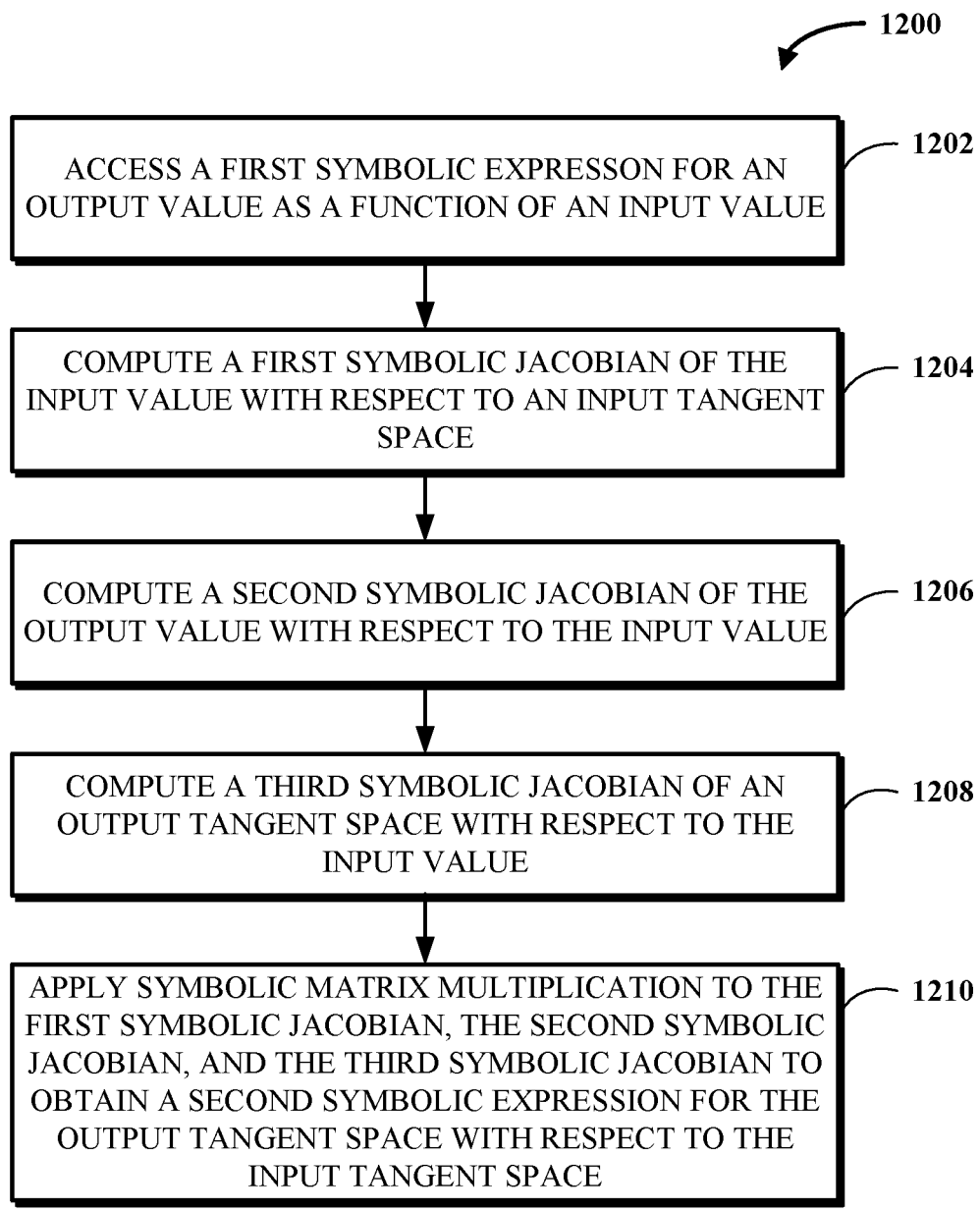
FIG. 12 is a flowchart of an example of a technique for computing a tangent-space Jacobian.

FIG. 12 is a flowchart of an example of a technique 1200 for computing a tangent-space Jacobian. The technique 1200 may be performed as a computing device, for example, the flight control subsystem 608 of the UAV 600 or another computing device that includes processing circuitry and memory.

At block 1202, the computing device accesses a first symbolic expression for an output value as a function of an input value. The output value may be an output matrix. The input value may be an input matrix. Accessing the first symbolic expression may include accessing a cost function for operating a UAV, as described above. The cost function may include the first symbolic expression.

At block 1204, the computing device computes, at a first component (e.g., a first thread, a first set of threads, a first processor, or a first set of processors) of the processing circuitry, a first symbolic Jacobian of the input value with respect to an input tangent space from a symbolic Lie group definition. The symbolic Lie group definition may be stored in the memory of the computing device.

At block 1206, the computing device computes, at a second component (e.g., a second thread, a second set of threads, a second processor, or a second set of processors) of the processing circuitry, a second symbolic Jacobian of the output value with respect to the input value.

At block 1208, the computing device computes, at a third component (e.g., e.g., a third thread, a third set of threads, a third processor, or a third set of processors) of the processing circuitry, a third symbolic Jacobian of an output tangent space with respect to the input value from the symbolic Lie group definition. The first component, the second component, and the third component may be mutually exclusive components of the UAV.

At block 1210, the computing device applies symbolic matrix multiplication to the first symbolic Jacobian, the second symbolic Jacobian, and the third symbolic Jacobian to obtain a second symbolic expression for the output tangent space with respect to the input tangent space. The second symbolic expression represents the computed tangent-space Jacobian. The computing device provides (e.g., for transmission or for display) as output a representation of the second symbolic expression.

As described above, the blocks 1204, 1206, and 1208 are performed in series. In some implementations, two or more of the blocks 1204, 1206, or 1208 are performed in parallel.

In some cases, the computing device controls operation of the UAV based on the second symbolic expression to implement an optimization based on the cost function associated with the first symbolic expression. The computing device may be the flight control subsystem of the UAV, and controlling operation of the UAV may include transmitting instructions to a motor (e.g., the motor 604) of the UAV.

Figure 13A:
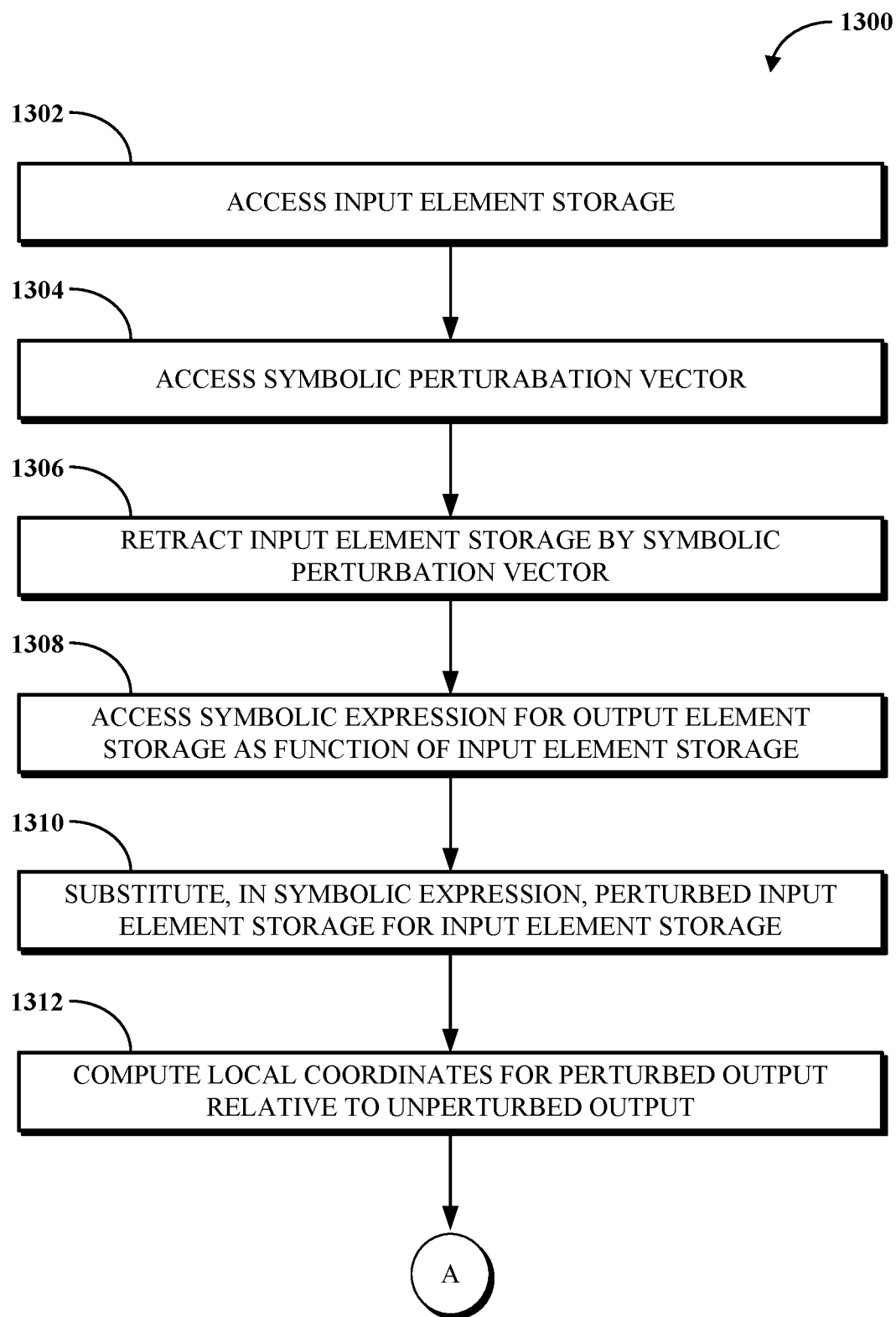
FIGS. 13A-13B are a flowchart of an example of a technique for symbolic differentiation using first-order retraction.
Figure 13B:
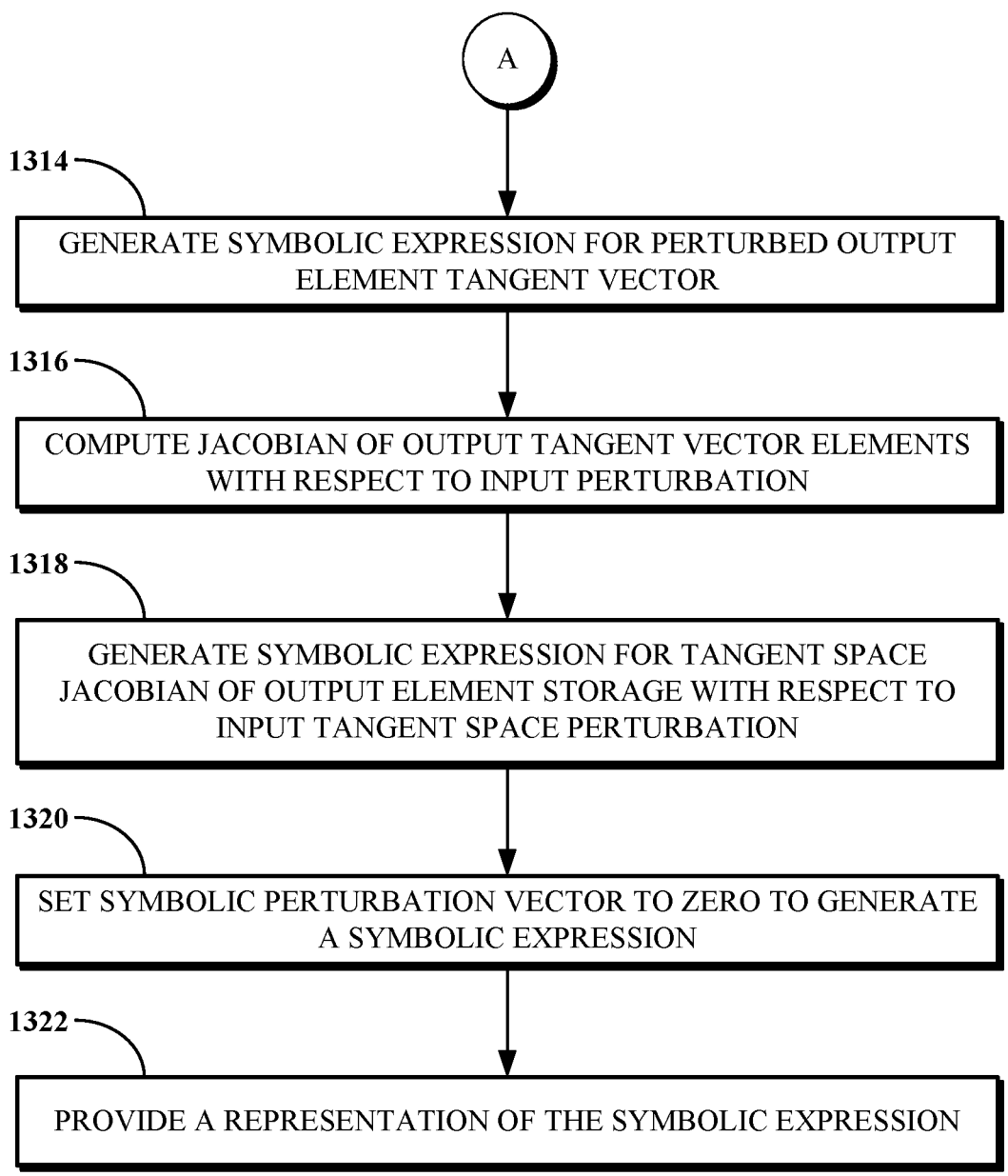

FIGS. 13A-13B are a flowchart of an example of a technique 1300 for symbolic differentiation using first-order retraction. The technique 1300 may be performed by a computing device including processing circuitry and memory. For example, the technique 1300 may be performed at the flight control subsystem 608 of the UAV 600 or another computing device.

As shown in FIG. 13A, at block 1302, the computing device accesses an input element storage. The input element storage may be a symbolic input element storage.

At block 1304, the computing device accesses, from the memory, a symbolic perturbation vector in an input tangent space.

At block 1306, the computing device retracts, using a symbolic computation engine of the computing device, the input element storage by the symbolic perturbation vector to generate a perturbed input element storage. The symbolic computation engine may be implemented using software, hardware, or a combination of software and hardware. In some implementations, the symbolic computation engine leverages the processing circuitry to manipulate symbolic mathematical expressions stored in the memory.

At block 1308, the computing device accesses, from the memory, a symbolic expression for output element storage as a function of the input element storage.

At block 1310, the computing device substitutes, in the symbolic expression using the symbolic computation engine, the perturbed input element storage for the input element storage.

At block 1312, the computing device computes, using the symbolic computation engine, local coordinates for a perturbed output relative to an unperturbed output.

As shown in FIG. 13B, at block 1314, the computing device generates, using the symbolic computation engine, a symbolic expression for a perturbed output element tangent vector as a function of input element storage and input tangent space perturbation.

At block 1316, the computing device computes, using the symbolic computation engine, a Jacobian of output tangent vector elements with respect to an input perturbation.

At block 1318, the computing device generates, using the symbolic computation engine, a symbolic expression for a tangent space Jacobian of the output element storage with respect to the input tangent space as a function of the input element storage and the input tangent space perturbation.

At block 1320, the computing device sets, using the symbolic computation engine, the symbolic perturbation vector to zero to generate a symbolic expression for the tangent space Jacobian of the output element storage with respect to the input tangent space as a function of the input element storage.

At block 1322, the computing device provides a representation of the symbolic expression for the tangent space Jacobian of the output element storage with respect to the input tangent space. The Jacobian of the output element storage with respect to the input tangent space is a matrix representing a symbolic derivative of the output element storage with respect to the input tangent space.

In some implementations, the symbolic expression for output element storage as the function of the input element storage represents a cost function for operating a UAV. The computing device controlling operation of the UAV to implement an optimization based on the cost function. The computing device is a flight control subsystem of the UAV, and controlling operation of the UAV comprises transmitting instructions to a motor of the UAV.

Some implementations are described below as numbered examples (Example 1, 2, 3, etc.). These examples are provided as examples only and do not limit the other implementations disclosed herein.

Example 1 is an unmanned aerial vehicle comprising: a flight control subsystem; and an electromechanical subsystem comprising a motor and at least one moving part, the electromechanical subsystem coupled with the flight control subsystem and configured to operate the motor or the at least one moving part as directed by the flight control subsystem; wherein the flight control subsystem is configured to: access, from memory, a problem definition including cost functions associated with travel of the unmanned aerial vehicle; control movement of the unmanned aerial vehicle based on the cost functions; adjust one or more of the cost functions during a flight of the unmanned aerial vehicle; and control further movement of the unmanned aerial vehicle based on the adjusted one or more of the cost functions.

In Example 2, the subject matter of Example 1 includes, wherein causing movement of the unmanned aerial vehicle comprises at least one of: automatically determining a flight path of the unmanned aerial vehicle, automatically determining a tilt of the unmanned aerial vehicle, or automatically determining a camera angle of a camera of the unmanned aerial vehicle.

In Example 3, the subject matter of Examples 1-2 includes, wherein adjusting the one or more of the cost functions during the flight of the unmanned aerial vehicle is based on at least one of: a user input or a conflict detected between two or more of the cost functions.

In Example 4, the subject matter of Examples 1-3 includes, wherein a cost function from the cost functions represents a difference between an expected position of the unmanned aerial vehicle in a three-dimensional space and an actual position of the unmanned aerial vehicle in the three-dimensional space.

In Example 5, the subject matter of Examples 1-4 includes, wherein a cost function from the cost functions represents a distance in pixels between a position of an object in an image captured by a camera and a center point of the image.

In Example 6, the subject matter of Examples 1-5 includes, wherein the cost functions are represented using symbolic expressions, wherein the flight control subsystem is configured to: manipulate the symbolic expressions to compute a tangent-space derivative of a Lie group element or a tangent-space Jacobian.

In Example 7, the subject matter of Example 6 includes, wherein, to manipulate the symbolic expressions, the flight control subsystem is configured to: access a cost function comprising a symbolic expression for an output storage as a function of an input storage; compute a first symbolic Jacobian of the input storage with respect to an input tangent space from a symbolic Lie group definition; compute a second symbolic Jacobian of the output storage with respect to the input storage; compute a third symbolic Jacobian of output tangent space with respect to the input storage from the symbolic Lie group definition; and apply symbolic matrix multiplication to the first symbolic Jacobian, the second symbolic Jacobian, and the third symbolic Jacobian to obtain a symbolic expression for the output tangent space with respect to the input tangent space.

In Example 8, the subject matter of Examples 6-7 includes, wherein, to manipulate the symbolic expressions, the flight control subsystem is configured to: access an input element storage; access a symbolic perturbation vector in an input tangent space; retract the input element storage by the symbolic perturbation vector to generate perturbed input element storage; access a symbolic expression for output element storage as a function of the input element storage; substitute, in the symbolic expression, the perturbed input element storage for the input element storage; compute local coordinates for a perturbed output relative to an unperturbed output; generate a symbolic expression for a perturbed output element tangent vector as a function of input element storage and input tangent space perturbation; compute a Jacobian of output tangent vector elements with respect to an input perturbation; generate a symbolic expression for a tangent space Jacobian of the output element storage with respect to the input tangent space as a function of the input element storage and the input tangent space perturbation; and set the symbolic perturbation vector to zero to generate a symbolic expression for the tangent space Jacobian of the output element storage with respect to the input tangent space as a function of the input element storage.

In Example 9, the subject matter of Example 8 includes, wherein the input element storage comprises a symbolic input element storage.

Example 10 is a method comprising: accessing, from a memory unit, a problem definition comprising cost functions associated with travel of an unmanned aerial vehicle; controlling movement of the unmanned aerial vehicle based on the cost functions; adjusting one or more of the cost functions during a flight of the unmanned aerial vehicle; and controlling further movement of the unmanned aerial vehicle based on the adjusted one or more of the cost functions.

In Example 11, the subject matter of Example 10 includes, wherein the cost functions are represented using symbolic expressions, the method further comprising: manipulating the symbolic expressions to compute a tangent-space derivative of a Lie group element or a tangent-space Jacobian.

In Example 12, the subject matter of Example 11 includes, wherein manipulating the symbolic expressions comprises: accessing a cost function comprising a symbolic expression for an output storage as a function of an input storage; computing a first symbolic Jacobian of the input storage with respect to an input tangent space from a symbolic Lie group definition; computing a second symbolic Jacobian of the output storage with respect to the input storage; computing a third symbolic Jacobian of output tangent space with respect to the input storage from the symbolic Lie group definition; and applying symbolic matrix multiplication to the first symbolic Jacobian, the second symbolic Jacobian, and the third symbolic Jacobian to obtain a symbolic expression for the output tangent space with respect to the input tangent space.

In Example 13, the subject matter of Examples 11-12 includes, wherein manipulating the symbolic expressions comprises: accessing an input element storage; accessing a symbolic perturbation vector in an input tangent space; retracting the input element storage by the symbolic perturbation vector to generate perturbed input element storage; accessing a symbolic expression for output element storage as a function of the input element storage; substituting, in the symbolic expression, the perturbed input element storage for the input element storage; computing local coordinates for a perturbed output relative to an unperturbed output; generating a symbolic expression for a perturbed output element tangent vector as a function of input element storage and input tangent space perturbation; computing a Jacobian of output tangent vector elements with respect to an input perturbation; generating a symbolic expression for a tangent space Jacobian of the output element storage with respect to the input tangent space as a function of the input element storage and the input tangent space perturbation; and setting the symbolic perturbation vector to zero to generate a symbolic expression for the tangent space Jacobian of the output element storage with respect to the input tangent space as a function of the input element storage.

In Example 14, the subject matter of Example 13 includes, wherein the input element storage comprises a symbolic input element storage.

Example 15 is a non-transitory computer-readable medium storing instructions which, when executed by an on-board computer of an unmanned aerial vehicle, causes the on-board computer to perform operations comprising: accessing, from a memory unit, a problem definition comprising cost functions associated with travel of an unmanned aerial vehicle; controlling movement of the unmanned aerial vehicle based on the cost functions; adjusting one or more of the cost functions during a flight of the unmanned aerial vehicle; and controlling further movement of the unmanned aerial vehicle based on the adjusted one or more of the cost functions.

In Example 16, the subject matter of Example 15 includes, wherein a cost function from the cost functions represents a difference between an expected position of the unmanned aerial vehicle in a three-dimensional space and an actual position of the unmanned aerial vehicle in the three-dimensional space.

In Example 17, the subject matter of Examples 15-16 includes, wherein a cost function from the cost functions represents a distance in pixels between a position of an object in an image captured by the camera and a center point of the image.

In Example 18, the subject matter of Examples 15-17 includes, wherein the cost functions are represented using symbolic expressions, the operations further comprising: manipulating the symbolic expressions to compute a tangent-space derivative of a Lie group element or a tangent-space Jacobian.

In Example 19, the subject matter of Example 18 includes, wherein manipulating the symbolic expressions comprises: accessing a cost function comprising a symbolic expression for an output storage as a function of an input storage; computing a first symbolic Jacobian of the input storage with respect to an input tangent space from a symbolic Lie group definition; computing a second symbolic Jacobian of the output storage with respect to the input storage; computing a third symbolic Jacobian of output tangent space with respect to the input storage from the symbolic Lie group definition; and applying symbolic matrix multiplication to the first symbolic Jacobian, the second symbolic Jacobian, and the third symbolic Jacobian to obtain a symbolic expression for the output tangent space with respect to the input tangent space.

In Example 20, the subject matter of Examples 18-19 includes, wherein manipulating the symbolic expressions comprises: accessing an input element storage; accessing a symbolic perturbation vector in an input tangent space; retracting the input element storage by the symbolic perturbation vector to generate perturbed input element storage; accessing a symbolic expression for output element storage as a function of the input element storage; substituting, in the symbolic expression, the perturbed input element storage for the input element storage; computing local coordinates for a perturbed output relative to an unperturbed output; generating a symbolic expression for a perturbed output element tangent vector as a function of input element storage and input tangent space perturbation; computing a Jacobian of output tangent vector elements with respect to an input perturbation; generating a symbolic expression for a tangent space Jacobian of the output element storage with respect to the input tangent space as a function of the input element storage and the input tangent space perturbation; and setting the symbolic perturbation vector to zero to generate a symbolic expression for the tangent space Jacobian of the output element storage with respect to the input tangent space as a function of the input element storage.

Example 21 is a method comprising: accessing, at a computing device comprising multithreaded processing circuitry and memory, a first symbolic expression for an output value as a function of an input value; computing, at a first thread of the multithreaded processing circuitry, a first symbolic Jacobian of the input value with respect to an input tangent space from a symbolic Lie group definition; computing, at a second thread of the multithreaded processing circuitry, a second symbolic Jacobian of the output value with respect to the input value; computing, at a third thread of the multithreaded processing circuitry, a third symbolic Jacobian of an output tangent space with respect to the input value from the symbolic Lie group definition; applying symbolic matrix multiplication to the first symbolic Jacobian, the second symbolic Jacobian, and the third symbolic Jacobian to obtain a second symbolic expression for the output tangent space with respect to the input tangent space; and providing a representation of the second symbolic expression.

In Example 22, the subject matter of Example 21 includes, wherein the first symbolic Jacobian, the second symbolic Jacobian, and the third symbolic Jacobian are computed in parallel.

In Example 23, the subject matter of Examples 21-22 includes, wherein accessing the first symbolic expression comprises accessing a cost function for operating an unmanned aerial vehicle, wherein the cost function comprises the first symbolic expression.

In Example 24, the subject matter of Example 23 includes, controlling operation of the unmanned aerial vehicle based on the second symbolic expression to implement an optimization based on the cost function.

In Example 25, the subject matter of Example 24 includes, wherein the computing device comprises a flight control subsystem of the unmanned aerial vehicle, and wherein controlling operation of the unmanned aerial vehicle comprises transmitting instructions to a motor of the unmanned aerial vehicle.

In Example 26, the subject matter of Examples 21-25 includes, wherein the first thread comprises one or more first threads, wherein the second thread comprises one or more second threads, wherein the third thread comprises one or more third threads.

In Example 27, the subject matter of Example 26 includes, wherein the one or more first threads, the one or more second threads, and the one or more third threads are mutually exclusive.

Example 28 is a non-transitory computer-readable medium storing instructions which, when executed by a computing device, causes the computing device to perform operations comprising: accessing, at the computing device comprising multithreaded processing circuitry and memory, a first symbolic expression for an output value as a function of an input value; computing, at a first thread of the multithreaded processing circuitry, a first symbolic Jacobian of the input value with respect to an input tangent space from a symbolic Lie group definition; computing, at a second thread of the multithreaded processing circuitry, a second symbolic Jacobian of the output value with respect to the input value; computing, at a third thread of the multithreaded processing circuitry, a third symbolic Jacobian of an output tangent space with respect to the input value from the symbolic Lie group definition; applying symbolic matrix multiplication to the first symbolic Jacobian, the second symbolic Jacobian, and the third symbolic Jacobian to obtain a second symbolic expression for the output tangent space with respect to the input tangent space; and providing a representation of the second symbolic expression.

In Example 29, the subject matter of Example 28 includes, wherein the first symbolic Jacobian, the second symbolic Jacobian, and the third symbolic Jacobian are computed in parallel.

In Example 30, the subject matter of Examples 28-29 includes, wherein accessing the first symbolic expression comprises accessing a cost function for operating an unmanned aerial vehicle, wherein the cost function comprises the first symbolic expression.

In Example 31, the subject matter of Example 30 includes, the operations further comprising: controlling operation of the unmanned aerial vehicle based on the second symbolic expression to implement an optimization based on the cost function.

In Example 32, the subject matter of Example 31 includes, wherein the computing device comprises a flight control subsystem of the unmanned aerial vehicle, and wherein controlling operation of the unmanned aerial vehicle comprises transmitting instructions to a motor of the unmanned aerial vehicle.

In Example 33, the subject matter of Examples 28-32 includes, wherein the first thread comprises one or more first threads, wherein the second thread comprises one or more second threads, wherein the third thread comprises one or more third threads.

In Example 34, the subject matter of Example 33 includes, wherein the one or more first threads, the one or more second threads, and the one or more third threads are mutually exclusive.

Example 35 is a computing device comprising: multithreaded processing circuitry; and a memory storing instructions which, when executed by the processing circuitry, cause the processing circuitry to: access a first symbolic expression for an output value as a function of an input value; compute, at a first thread of the multithreaded processing circuitry, a first symbolic Jacobian of the input value with respect to an input tangent space from a symbolic Lie group definition; compute, at a second thread of the multithreaded processing circuitry, a second symbolic Jacobian of the output value with respect to the input value; compute, at a third thread of the multithreaded processing circuitry, a third symbolic Jacobian of an output tangent space with respect to the input value from the symbolic Lie group definition; apply symbolic matrix multiplication to the first symbolic Jacobian, the second symbolic Jacobian, and the third symbolic Jacobian to obtain a second symbolic expression for the output tangent space with respect to the input tangent space; and provide a representation of the second symbolic expression.

In Example 36, the subject matter of Example 35 includes, wherein the first symbolic Jacobian, the second symbolic Jacobian, and the third symbolic Jacobian are computed in parallel.

In Example 37, the subject matter of Examples 35-36 includes, wherein accessing the first symbolic expression comprises accessing a cost function for operating an unmanned aerial vehicle, wherein the cost function comprises the first symbolic expression.

In Example 38, the subject matter of Example 37 includes, the memory further storing instructions which, when executed by the processing circuitry, cause the processing circuitry to: control operation of the unmanned aerial vehicle based on the second symbolic expression to implement an optimization based on the cost function.

In Example 39, the subject matter of Example 38 includes, wherein the computing device comprises a flight control subsystem of the unmanned aerial vehicle, and wherein controlling operation of the unmanned aerial vehicle comprises transmitting instructions to a motor of the unmanned aerial vehicle.

In Example 40, the subject matter of Examples 35-39 includes, wherein the first thread comprises one or more first threads, wherein the second thread comprises one or more second threads, wherein the third thread comprises one or more third threads.

Example 41 is a method comprising: accessing, at a computing device comprising processing circuitry and memory, an input element storage; accessing, from the memory, a symbolic perturbation vector in an input tangent space; retracting, using a symbolic computation engine of the computing device, the input element storage by the symbolic perturbation vector to generate a perturbed input element storage; accessing, from the memory, a symbolic expression for output element storage as a function of the input element storage; substituting, in the symbolic expression using the symbolic computation engine, the perturbed input element storage for the input element storage; computing, using the symbolic computation engine, local coordinates for a perturbed output relative to an unperturbed output; generating, using the symbolic computation engine, a symbolic expression for a perturbed output element tangent vector as a function of input element storage and input tangent space perturbation; computing, using the symbolic computation engine, a Jacobian of output tangent vector elements with respect to an input perturbation; generating, using the symbolic computation engine, a symbolic expression for a tangent space Jacobian of the output element storage with respect to the input tangent space as a function of the input element storage and the input tangent space perturbation; setting, using the symbolic computation engine, the symbolic perturbation vector to zero to generate a symbolic expression for the tangent space Jacobian of the output element storage with respect to the input tangent space as a function of the input element storage; and providing a representation of the symbolic expression for the tangent space Jacobian of the output element storage with respect to the input tangent space.

In Example 42, the subject matter of Example 41 includes, wherein the symbolic computation engine leverages the processing circuitry to manipulate symbolic mathematical expressions stored in the memory.

In Example 43, the subject matter of Examples 41-42 includes, wherein the input element storage comprises a symbolic input element storage.

In Example 44, the subject matter of Examples 41-43 includes, wherein the symbolic expression for output element storage as the function of the input element storage represents a cost function for operating an unmanned aerial vehicle.

In Example 45, the subject matter of Example 44 includes, controlling operation of the unmanned aerial vehicle to implement an optimization based on the cost function.

In Example 46, the subject matter of Example 45 includes, wherein the computing device comprises a flight control subsystem of the unmanned aerial vehicle, and wherein controlling operation of the unmanned aerial vehicle comprises transmitting instructions to a motor of the unmanned aerial vehicle.

In Example 47, the subject matter of Examples 41-46 includes, wherein the Jacobian of the output element storage with respect to the input tangent space comprises a matrix representing a symbolic derivative of the output element storage with respect to the input tangent space.

Example 48 is a non-transitory computer-readable medium storing instructions which, when executed by a computing device, causes the computing device to perform operations comprising: accessing, at the computing device comprising processing circuitry and memory, an input element storage; accessing, from the memory, a symbolic perturbation vector in an input tangent space; retracting, using a symbolic computation engine of the computing device, the input element storage by the symbolic perturbation vector to generate a perturbed input element storage; accessing, from the memory, a symbolic expression for output element storage as a function of the input element storage; substituting, in the symbolic expression using the symbolic computation engine, the perturbed input element storage for the input element storage; computing, using the symbolic computation engine, local coordinates for a perturbed output relative to an unperturbed output; generating, using the symbolic computation engine, a symbolic expression for a perturbed output element tangent vector as a function of input element storage and input tangent space perturbation; computing, using the symbolic computation engine, a Jacobian of output tangent vector elements with respect to an input perturbation; generating, using the symbolic computation engine, a symbolic expression for a tangent space Jacobian of the output element storage with respect to the input tangent space as a function of the input element storage and the input tangent space perturbation; setting, using the symbolic computation engine, the symbolic perturbation vector to zero to generate a symbolic expression for the tangent space Jacobian of the output element storage with respect to the input tangent space as a function of the input element storage; and providing a representation of the symbolic expression for the tangent space Jacobian of the output element storage with respect to the input tangent space.

In Example 49, the subject matter of Example 48 includes, wherein the symbolic computation engine leverages the processing circuitry to manipulate symbolic mathematical expressions stored in the memory.

In Example 50, the subject matter of Examples 48-49 includes, wherein the input element storage comprises a symbolic input element storage.

In Example 51, the subject matter of Examples 48-50 includes, wherein the symbolic expression for output element storage as the function of the input element storage represents a cost function for operating an unmanned aerial vehicle.

In Example 52, the subject matter of Example 51 includes, the operations further comprising: controlling operation of the unmanned aerial vehicle to implement an optimization based on the cost function.

In Example 53, the subject matter of Example 52 includes, wherein the computing device comprises a flight control subsystem of the unmanned aerial vehicle, and wherein controlling operation of the unmanned aerial vehicle comprises transmitting instructions to a motor of the unmanned aerial vehicle.

In Example 54, the subject matter of Examples 48-53 includes, wherein the Jacobian of the output element storage with respect to the input tangent space comprises a matrix representing a symbolic derivative of the output element storage with respect to the input tangent space.

Example 55 is a computing device comprising: processing circuitry; and a memory storing instructions which, when executed by the processing circuitry, cause the processing circuitry to: access an input element storage; access, from the memory, a symbolic perturbation vector in an input tangent space; retract, using a symbolic computation engine of the computing device, the input element storage by the symbolic perturbation vector to generate a perturbed input element storage; access, from the memory, a symbolic expression for output element storage as a function of the input element storage; substitute, in the symbolic expression using the symbolic computation engine, the perturbed input element storage for the input element storage; compute, using the symbolic computation engine, local coordinates for a perturbed output relative to an unperturbed output; generate, using the symbolic computation engine, a symbolic expression for a perturbed output element tangent vector as a function of input element storage and input tangent space perturbation; compute, using the symbolic computation engine, a Jacobian of output tangent vector elements with respect to an input perturbation; generate, using the symbolic computation engine, a symbolic expression for a tangent space Jacobian of the output element storage with respect to the input tangent space as a function of the input element storage and the input tangent space perturbation; set, using the symbolic computation engine, the symbolic perturbation vector to zero to generate a symbolic expression for the tangent space Jacobian of the output element storage with respect to the input tangent space as a function of the input element storage; and provide a representation of the symbolic expression for the tangent space Jacobian of the output element storage with respect to the input tangent space.

In Example 56, the subject matter of Example 55 includes, wherein the symbolic computation engine leverages the processing circuitry to manipulate symbolic mathematical expressions stored in the memory.

In Example 57, the subject matter of Examples 55-56 includes, wherein the input element storage comprises a symbolic input element storage.

In Example 58, the subject matter of Examples 55-57 includes, wherein the symbolic expression for output element storage as the function of the input element storage represents a cost function for operating an unmanned aerial vehicle.

In Example 59, the subject matter of Example 58 includes, the memory further storing instructions which, when executed by the processing circuitry, cause the processing circuitry to: control operation of the unmanned aerial vehicle to implement an optimization based on the cost function.

In Example 60, the subject matter of Example 59 includes, wherein the computing device comprises a flight control subsystem of the unmanned aerial vehicle, and wherein controlling operation of the unmanned aerial vehicle comprises transmitting instructions to a motor of the unmanned aerial vehicle.

Example 61 is a method comprising: accessing a first symbolic expression for an output matrix as a function of an input matrix at a computing device comprising processing circuitry and memory; computing, at a first component of the processing circuitry, a first Jacobian of the input matrix with respect to an input tangent space; computing, at a second component of the processing circuitry, a second Jacobian of the output matrix with respect to the input matrix; computing, at a third component of the processing circuitry, a third Jacobian of an output tangent space with respect to the input matrix; applying symbolic matrix multiplication to the first Jacobian, the second Jacobian, and the third Jacobian to obtain a second symbolic expression for the output tangent space with respect to the input tangent space; and providing a representation of the second symbolic expression, the second symbolic expression representing a computed tangent-space Jacobian.

In Example 62, the subject matter of Example 61 includes, wherein the first component comprises a first thread, wherein the second component comprises a second thread, and wherein the third component comprises a third thread.

In Example 63, the subject matter of Examples 61-62 includes, wherein the first component comprises a first processor, wherein the second component comprises a second processor, and wherein the third component comprises a third processor.

In Example 64, the subject matter of Examples 61-63 includes, wherein two or more of the first component, the second component, and the third component operate in parallel.

In Example 65, the subject matter of Examples 61-64 includes, wherein the input tangent space and the output tangent space are defined in a symbolic Lie group definition stored in the memory.

In Example 66, the subject matter of Examples 61-65 includes, wherein accessing the first symbolic expression comprises accessing a cost function for operating an unmanned aerial vehicle, wherein the cost function comprises the first symbolic expression.

In Example 67, the subject matter of Example 66 includes, controlling operation of the unmanned aerial vehicle based on the second symbolic expression to implement an optimization based on the cost function.

In Example 68, the subject matter of Example 67 includes, wherein the computing device comprises a flight control subsystem of the unmanned aerial vehicle, and wherein controlling operation of the unmanned aerial vehicle comprises transmitting instructions to a motor of the unmanned aerial vehicle.

Example 69 is a non-transitory computer-readable medium storing instructions which, when executed by a computing device, causes the computing device to perform operations comprising: accessing a first symbolic expression for an output matrix as a function of an input matrix at the computing device comprising processing circuitry and memory; computing, at a first component of the processing circuitry, a first Jacobian of the input matrix with respect to an input tangent space; computing, at a second component of the processing circuitry, a second Jacobian of the output matrix with respect to the input matrix; computing, at a third component of the processing circuitry, a third Jacobian of an output tangent space with respect to the input matrix; applying symbolic matrix multiplication to the first Jacobian, the second Jacobian, and the third Jacobian to obtain a second symbolic expression for the output tangent space with respect to the input tangent space; and providing a representation of the second symbolic expression, the second symbolic expression representing a computed tangent-space Jacobian.

In Example 70, the subject matter of Example 69 includes, wherein the first component comprises a first thread, wherein the second component comprises a second thread, and wherein the third component comprises a third thread.

In Example 71, the subject matter of Examples 69-70 includes, wherein the first component comprises a first processor, wherein the second component comprises a second processor, and wherein the third component comprises a third processor.

In Example 72, the subject matter of Examples 69-71 includes, wherein two or more of the first component, the second component, and the third component operate in parallel.

In Example 73, the subject matter of Examples 69-72 includes, wherein the input tangent space and the output tangent space are defined in a symbolic Lie group definition stored in the memory.

In Example 74, the subject matter of Examples 69-73 includes, wherein accessing the first symbolic expression comprises accessing a cost function for operating an unmanned aerial vehicle, wherein the cost function comprises the first symbolic expression.

In Example 75, the subject matter of Example 74 includes, the operations further comprising: controlling operation of the unmanned aerial vehicle based on the second symbolic expression to implement an optimization based on the cost function.

In Example 76, the subject matter of Example 75 includes, wherein the computing device comprises a flight control subsystem of the unmanned aerial vehicle, and wherein controlling operation of the unmanned aerial vehicle comprises transmitting instructions to a motor of the unmanned aerial vehicle.

Example 77 is a computing device comprising: processing circuitry; and a memory storing instructions which, when executed by the processing circuitry, cause the processing circuitry to: access a first symbolic expression for an output matrix as a function of an input matrix; compute, at a first component of the processing circuitry, a first Jacobian of the input matrix with respect to an input tangent space; compute, at a second component of the processing circuitry, a second Jacobian of the output matrix with respect to the input matrix; compute, at a third component of the processing circuitry, a third Jacobian of an output tangent space with respect to the input matrix; apply symbolic matrix multiplication to the first Jacobian, the second Jacobian, and the third Jacobian to obtain a second symbolic expression for the output tangent space with respect to the input tangent space; and provide a representation of the second symbolic expression, the second symbolic expression representing a computed tangent-space Jacobian.

In Example 78, the subject matter of Example 77 includes, wherein the first component comprises a first thread, wherein the second component comprises a second thread, and wherein the third component comprises a third thread.

In Example 79, the subject matter of Examples 77-78 includes, wherein the first component comprises a first processor, wherein the second component comprises a second processor, and wherein the third component comprises a third processor.

In Example 80, the subject matter of Examples 77-79 includes, wherein two or more of the first component, the second component, and the third component operate in parallel.

Example 81 is at least one machine-readable medium including instructions that, when executed by processing circuitry, cause the processing circuitry to perform operations to implement of any of Examples 1-80.

Example 82 is an apparatus comprising means to implement of any of Examples 1-80.

Example 83 is a system to implement of any of Examples 1-80.

Example 84 is a method to implement of any of Examples 1-80.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    accessing, at a computing device comprising processing circuitry and memory, an input element storage;
    accessing, from the memory, a symbolic perturbation vector in an input tangent space;
    retracting, using a symbolic computation engine of the computing device, the input element storage by the symbolic perturbation vector to generate a perturbed input element storage;
    accessing, from the memory, a symbolic expression for an output element storage as a function of the input element storage;
    substituting, in the symbolic expression using the symbolic computation engine, the perturbed input element storage for the input element storage;
    computing, using the symbolic computation engine, local coordinates for a perturbed output relative to an unperturbed output;
    generating, using the symbolic computation engine, a symbolic expression for a perturbed output element tangent vector as a function of input element storage and input tangent space perturbation;
    computing, using the symbolic computation engine, a Jacobian of output tangent vector elements with respect to an input perturbation;
    generating, using the symbolic computation engine, a symbolic expression for a tangent space Jacobian of the output element storage with respect to the input tangent space as a function of the input element storage and the input tangent space perturbation;
    setting, using the symbolic computation engine, the symbolic perturbation vector to zero to generate a symbolic expression for the tangent space Jacobian of the output element storage with respect to the input tangent space as a function of the input element storage; and
    controlling operation of an unmanned aerial vehicle based on the symbolic expression for the output element storage as the function of the input element storage, wherein the symbolic expression for the output element storage as the function of the input element storage represents a cost function for operating the unmanned aerial vehicle, wherein controlling the operation of the unmanned aerial vehicle comprises controlling the operation of the unmanned aerial vehicle to implement an optimization based on the cost function.

2. The method of claim 1, wherein the symbolic computation engine leverages the processing circuitry to manipulate symbolic mathematical expressions stored in the memory.

3. The method of claim 1, wherein the input element storage comprises a symbolic input element storage.

4. The method of claim 1, wherein the computing device comprises a flight control subsystem of the unmanned aerial vehicle, and wherein controlling operation of the unmanned aerial vehicle comprises transmitting instructions to a motor of the unmanned aerial vehicle.

5. The method of claim 1, wherein the Jacobian of the output element storage with respect to the input tangent space comprises a matrix representing a symbolic derivative of the output element storage with respect to the input tangent space.

6. A non-transitory computer-readable medium storing instructions which, when executed by a computing device, causes the computing device to perform operations comprising:
    accessing, at the computing device comprising processing circuitry and memory, an input element storage;
    accessing, from the memory, a symbolic perturbation vector in an input tangent space;

retracting, using a symbolic computation engine of the computing device, the input element storage by the symbolic perturbation vector to generate a perturbed input element storage;

accessing, from the memory, a symbolic expression for an output element storage as a function of the input element storage;

substituting, in the symbolic expression using the symbolic computation engine, the perturbed input element storage for the input element storage;

computing, using the symbolic computation engine, local coordinates for a perturbed output relative to an unperturbed output;

generating, using the symbolic computation engine, a symbolic expression for a perturbed output element tangent vector as a function of input element storage and input tangent space perturbation;

computing, using the symbolic computation engine, a Jacobian of output tangent vector elements with respect to an input perturbation;

generating, using the symbolic computation engine, a symbolic expression for a tangent space Jacobian of the output element storage with respect to the input tangent space as a function of the input element storage and the input tangent space perturbation;

setting, using the symbolic computation engine, the symbolic perturbation vector to zero to generate a symbolic expression for the tangent space Jacobian of the output element storage with respect to the input tangent space as a function of the input element storage; and controlling operation of an unmanned aerial vehicle based on the symbolic expression for the output element storage as the function of the input element storage, wherein the symbolic expression for the output element storage as the function of the input element storage represents a cost function for operating the unmanned aerial vehicle, wherein controlling the operation of the unmanned aerial vehicle comprises controlling the operation of the unmanned aerial vehicle to implement an optimization based on the cost function.

7. The computer-readable medium of claim 6, wherein the symbolic computation engine leverages the processing circuitry to manipulate symbolic mathematical expressions stored in the memory.

8. The computer-readable medium of claim 6, wherein the input element storage comprises a symbolic input element storage.

9. The computer-readable medium of claim 6, wherein the computing device comprises a flight control subsystem of the unmanned aerial vehicle, and wherein controlling operation of the unmanned aerial vehicle comprises transmitting instructions to a motor of the unmanned aerial vehicle.

10. The computer-readable medium of claim 6, wherein the Jacobian of the output element storage with respect to the input tangent space comprises a matrix representing a symbolic derivative of the output element storage with respect to the input tangent space.

11. A computing device comprising:
processing circuitry; and
a memory storing instructions which, when executed by the processing circuitry, cause the processing circuitry to:

access an input element storage;

access, from the memory, a symbolic perturbation vector in an input tangent space;

retract, using a symbolic computation engine of the computing device, the input element storage by the symbolic perturbation vector to generate a perturbed input element storage;

access, from the memory, a symbolic expression for an output element storage as a function of the input element storage;

substitute, in the symbolic expression using the symbolic computation engine, the perturbed input element storage for the input element storage;

compute, using the symbolic computation engine, local coordinates for a perturbed output relative to an unperturbed output;

generate, using the symbolic computation engine, a symbolic expression for a perturbed output element tangent vector as a function of input element storage and input tangent space perturbation;

compute, using the symbolic computation engine, a Jacobian of output tangent vector elements with respect to an input perturbation;

generate, using the symbolic computation engine, a symbolic expression for a tangent space Jacobian of the output element storage with respect to the input tangent space as a function of the input element storage and the input tangent space perturbation;

set, using the symbolic computation engine, the symbolic perturbation vector to zero to generate a symbolic expression for the tangent space Jacobian of the output element storage with respect to the input tangent space as a function of the input element storage; and control operation of an unmanned aerial vehicle based on the symbolic expression for the output element storage as the function of the input element storage, wherein the symbolic expression for the output element storage as the function of the input element storage represents a cost function for operating the unmanned aerial vehicle, wherein controlling the operation of the unmanned aerial vehicle comprises controlling the operation of the unmanned aerial vehicle to implement an optimization based on the cost function.

12. The computing device of claim 11, wherein the symbolic computation engine leverages the processing circuitry to manipulate symbolic mathematical expressions stored in the memory.

13. The computing device of claim 11, wherein the input element storage comprises a symbolic input element storage.

14. The computing device of claim 11, wherein the computing device comprises a flight control subsystem of the unmanned aerial vehicle, and wherein controlling operation of the unmanned aerial vehicle comprises transmitting instructions to a motor of the unmanned aerial vehicle.

15. The computing device of claim 11, wherein the Jacobian of the output element storage with respect to the input tangent space comprises a matrix representing a symbolic derivative of the output element storage with respect to the input tangent space.

* * * * *